US011388398B2

(12) United States Patent
Han et al.

(10) Patent No.: US 11,388,398 B2
(45) Date of Patent: Jul. 12, 2022

(54) VIDEO CODING USING LOCAL ILLUMINATION COMPENSATION

(71) Applicant: QUALCOMM Incorporated, San Diego, CA (US)

(72) Inventors: Yu Han, San Diego, CA (US); Kai Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/772,424

(22) PCT Filed: Jan. 11, 2018

(86) PCT No.: PCT/CN2018/072218
§ 371 (c)(1),
(2) Date: Jun. 12, 2020

(87) PCT Pub. No.: WO2019/136657
PCT Pub. Date: Jul. 18, 2019

(65) Prior Publication Data
US 2021/0076029 A1  Mar. 11, 2021

(51) Int. Cl.
H04N 19/107 (2014.01)
H04N 19/176 (2014.01)
(Continued)

(52) U.S. Cl.
CPC ......... H04N 19/107 (2014.11); H04N 19/176 (2014.11); H04N 19/503 (2014.11); H04N 19/593 (2014.11)

(58) Field of Classification Search
None
See application file for complete search history.

(56) References Cited

U.S. PATENT DOCUMENTS 9,807,424 B2   10/2017  Guo et al.
9,883,203 B2   1/2018   Chien et al.
(Continued)

FOREIGN PATENT DOCUMENTS

JP    2016213519 A    12/2016

OTHER PUBLICATIONS

International Preliminary Report On Patentability—PCT/CN2018/072218—ISA/EPO—dated Jul. 23, 2020, 6 pgs.
(Continued)

Primary Examiner — Christopher G Findley
(74) Attorney, Agent, or Firm — Shumaker & Sieffert, P.A.

(57) ABSTRACT

A video coding device includes a memory configured to store video data, and processing circuitry in communication with the memory. The processing circuitry is configured to determine that a current block of the video data stored to the memory is to be coded according to a merge mode, and to determine a temporal candidate associated with a merge candidate list for the current block in accordance with the merge mode. The processing circuitry is further configured to determine a pool of spatial candidates associated with the merge candidate list, based on each spatial candidate of the pool having a same reference picture as the temporal candidate, and to set a local illumination compensation (LIC) flag value for the temporal candidate based on respective LIC flag values of one or more spatial candidates of the pool.

24 Claims, 19 Drawing Sheets

(51) Int. Cl.
  *H04N 19/503* (2014.01)
  *H04N 19/593* (2014.01)

(56) References Cited

U.S. PATENT DOCUMENTS

| | | | |
|---|---|---|---|
| 10,257,543 | B2 | 4/2019 | Guo et al. |
| 2013/0188720 | A1 | 7/2013 | Wang et al. |
| 2016/0065964 | A1 | 3/2016 | Zhang et al. |
| 2016/0295227 | A1 | 10/2016 | Park et al. |
| 2016/0366415 | A1 | 12/2016 | Liu et al. |
| 2016/0366416 | A1* | 12/2016 | Liu ................ H04N 19/109 |
| 2018/0242024 | A1* | 8/2018 | Chen ............... H04N 19/66 |

OTHER PUBLICATIONS

International Search Report and Written Opinion—PCT/CN2018/072218—ISA/EPO—dated Sep. 29, 2018, 9 pgs.
Tech G., et al., "3D-HEVC Draft Text 7", Joint Collaborative Team on 3D Video Coding Extensions of ITU-T SG 16 WP 3 and ISO/IEC JTC 1/SC 29/WG 11(JCT-3V), Doc. JCT3V-K1001-v9, 11th Meeting: Geneva, Switzerland, Feb. 12-18, 2015, 101 pages.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
ITU-T H.265, Series H: Audiovisual and Multimedia Systems, Infrastructure of Audiovisual Services—Coding of Moving Video, High Efficiency Video Coding, The International Telecommunication Union, Dec. 2019, 664 Pages.
Liu H., et al., "Multiple Hypotheses Bayesian Frame Rate Up-Conversion by Adaptive Fusion of Motion-Compensated Interpolations", IEEE transactions on Circuits and Systems for Video Technology, Aug. 2012, vol. 22, No. 11, pp. 1188-1198.
Lee W.H., et al., "Frame Rate Up Conversion Based on Variational Image Fusion", IEEE Transactions on Image processing, Jan. 2014, vol. 23, No. 1, pp. 399-412.
Kim U.S., et al., "New Frame Rate Up-Conversion Algorithms With Low Computational Complexity", IEEE Transactions on circuits and systems for video technology, Mar. 2014, vol. 24, No. 3, pp. 384-393.
Kamp S., et al., "Decoder-Side Motion Vector Derivation for Block-Based Video Coding", IEEE transactions on circuits and systems for video technology, vol. 22, No. 12, Dec. 2012, pp. 1732-1745.

Chiu Y-J., et al., "Decoder-side Motion Estimation and Wiener Filter for HEVC", 2013 Visual Communications And Image Processing (VCIP), IEEE, Nov. 17, 2013 (Nov. 17, 2013), pp. 1-6.
ITU-T H.263, Line Transmission of Non-Telephone Signals, Video Coding for Low Bitrate Communication, The International Telecommunication Union, May 2, 1996, 54 pages.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
Fujibayashi A., et al., "TE12: Performance of Partition Based Illumination Compensation (PBIC)", 3rd JCT-VC Meeting, 94th MPEG Meeting, Oct. 7, 2010-Oct. 15, 2010, Guangzhou, (Joint Collaborative Team on Video Coding of ISO/IEC JTC1/SC29/WG11 and ITU-T SG.16), URL: http://WFTP3.ITU.INT/AV-ARCH/JCTVC-SITE/, No. JCTVC-C041, Oct. 1, 2010 (Oct. 1, 2010), XP030007748, pp. 1-12, Section 2.
Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.
Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-V9, Oct. 3-12, 2018, 235 pp.
Seregin V., et al., "CE10-Related: Unidirectional Illumination Compensation", Joint Video Experts Team (JVET) of ITU-T SG 16 WP 3 and ISO/IEC JTC 1/SC 29/WG 11, JVET-M0500-V3, 13th Meeting, Jan. 9-18, 2019, 4 pages.
Seregin V., et al., "CE1: Unidirectional Illumination Compensation (CE1-5.1)", Joint Video Experts Team (JVET) of ITU-T SG 16 WP 3 and ISO/IEC JTC 1/SC 29/WG 11, JVET-N0343-V3, 14th Meeting, Mar. 19-27, 2019, 304 pages.
Chen J., et al., "Algorithm Description of Joint Exploration Test Model 7 (JEM7)", JVET-G1001-V1, Joint Video Exploration Team (JVET) of ITU-T SG 16 WP3 and ISO/IEC JTC 1/SC 29/WG 11, No. N17055, 7th Meeting, Jul. 13, 2017-Jul. 21, 2017, Torino, Aug. 19, 2017 (Aug. 19, 2017), XP030150980, 48 Pages, pp. i-iv, Retrieved from the Internet: URL: http://phenix.int-evry.fr/jvet/doc_end_user/documents/7_Torino/wg11/JVET-G0001-v1.zip.
Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06_r1, Jun. 25, 2015 (Jun. 25, 2015), XP030003884, 4 Pages.
Supplementary European Search Report—EP18900321—Search Authority—The Hague—dated Jul. 9, 2021.

* cited by examiner

Spatial neighboring MV candidates for (a) merge mode, and (b) AMVP mode.

(a) TMVP candidate, and
(B) MV scaling.

FIG. 7

VIDEO CODING USING LOCAL ILLUMINATION COMPENSATION

This application is a national stage application under 35 U.S.C. § 371 of PCT Application No. PCT/CN2018/072218, filed Jan. 11, 2018.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC), standard, and extensions of such standards (including, but not limited to, the range extension to HEVC, the screen content coding extension to HEVC, the three-dimensional (3D) HEVC extension, the multiview HEVC extension (MV-HEVC), the scalable HEVC (SHVC) extension, etc.).

In 2016, MPEG and ITU-T VCEG formed a joint exploration video team (JVET) to explore new coding tools for the next generation of video coding standards. Reference software created by the JVET is referred to as JEM (joint exploration model). The video devices may transmit, receive, encode, decode, and/or store digital video information more efficiently by implementing video compression techniques in accordance with one or more of the video coding standards, extensions, reference software, or future video coding standards under development that are listed above.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to local illumination compensation (LIC) in block-based video coding, merge mode coding, the use of picture order count (POC) values to identify individual pictures in a coded video sequence, the use of reference picture lists, and optionally, other video coding technologies such as overlapped block motion compensation (OBMC), weighted prediction applied for inter prediction, intra prediction, and/or other video coding technologies.

In one example, this disclosure is directed to a method of coding video data. The method includes determining that a current block of the video data is to be coded according to a merge mode, and determining a temporal candidate associated with a merge candidate list for the current block in accordance with the merge mode. The method further includes determining a pool of spatial candidates associated with the merge candidate list, based on each spatial candidate of the pool having a same reference picture as the temporal candidate, and setting a local illumination compensation (LIC) flag value for the temporal candidate based on respective LIC flag values of one or more spatial candidates of the pool.

In another example, this disclosure is directed to a video coding device that includes a memory configured to store video data, and processing circuitry in communication with the memory. The processing circuitry is configured to determine that a current block of the video data stored to the memory is to be coded according to a merge mode, and to determine a temporal candidate associated with a merge candidate list for the current block in accordance with the merge mode. The processing circuitry is further configured to determine a pool of spatial candidates associated with the merge candidate list, based on each spatial candidate of the pool having a same reference picture as the temporal candidate, and to set a local illumination compensation (LIC) flag value for the temporal candidate based on respective LIC flag values of one or more spatial candidates of the pool.

In another example, this disclosure is directed to an apparatus. The apparatus includes means for determining that a current block of video data is to be coded according to a merge mode, and means for determining a temporal candidate associated with a merge candidate list for the current block in accordance with the merge mode. The apparatus further includes means for determining a pool of spatial candidates associated with the merge candidate list, based on each spatial candidate of the pool having a same reference picture as the temporal candidate, and means for setting a local illumination compensation (LIC) flag value for the temporal candidate based on respective LIC flag values of one or more spatial candidates of the pool.

In another example, this disclosure is directed to a non-transitory computer-readable storage medium encoded with instructions. The instructions, when executed, cause one or more processors of a video coding device to determine that a current block of video data is to be coded according to a merge mode, and to determine a temporal candidate associated with a merge candidate list for the current block in accordance with the merge mode. The instructions, when executed, further cause the one or more processors of the video coding device to determine a pool of spatial candidates associated with the merge candidate list, based on each spatial candidate of the pool having a same reference picture as the temporal candidate, and to set a local illumination compensation (LIC) flag value for the temporal candidate based on respective LIC flag values of one or more spatial candidates of the pool.

The details of one or more examples are set forth in the accompanying drawings and the description below. Other features, objects, and advantages will be apparent from the description, drawings, and the claims.

BRIEF DESCRIPTION OF THE DRAWINGS

FIG. 7 is a conceptual diagram illustrating aspects of OBMC according to the high efficiency video coding (HEVC) standard.

DETAILED DESCRIPTION

This disclosure describes techniques related to local illumination compensation (LIC), overlapped block motion compensation (OBMC), weighted prediction applied for inter prediction, and intra prediction, and/or other video coding technologies. The techniques may be used in the context of advanced video codecs, such as the next generation of video coding standards, including but not limited to the H.266 standard presently under development. According to existing LIC algorithms, for merge mode-coded blocks, the motion information and LIC flag are derived from the candidates in the merge candidate list. Therefore, the temporal candidates need to store the LIC flag in a reference buffer, thereby increasing the cost of memory. The techniques of this disclosure enable video coding devices to derive the LIC flag of temporal candidates from the spatial neighbors and/or spatial candidates. As such, the techniques of this disclosure mitigate or potentially eliminate the need to store the LIC flag information in a reference buffer.

As used herein, the term "video coder" refers generically to both video encoders and video decoders. Similarly, in this disclosure, the terms "video coding" or "coding" may refer generically to video encoding or video decoding. Thus, unless stated otherwise, it should be assumed that techniques described with reference to coding may be performed by either a video encoder or a video decoder. In some portions of this application, certain techniques may be described with reference to video decoding or to a video decoder. It should not be assumed, however, that such techniques are not applicable to video encoding or may be not be performed by a video encoder. Such techniques may, for example, be performed as part of determining how to encode video data or may be performed as part of a video decoding loop in a video encoder.

As used in this disclosure, the term current block refers to a block currently being coded, as opposed to a block that is already coded or yet to be coded. Similarly, a current coding unit (CU), prediction unit (PU), or transform unit (TU), refers to a coding unit, prediction unit, or transform unit that is currently being coded.

Figure 1:
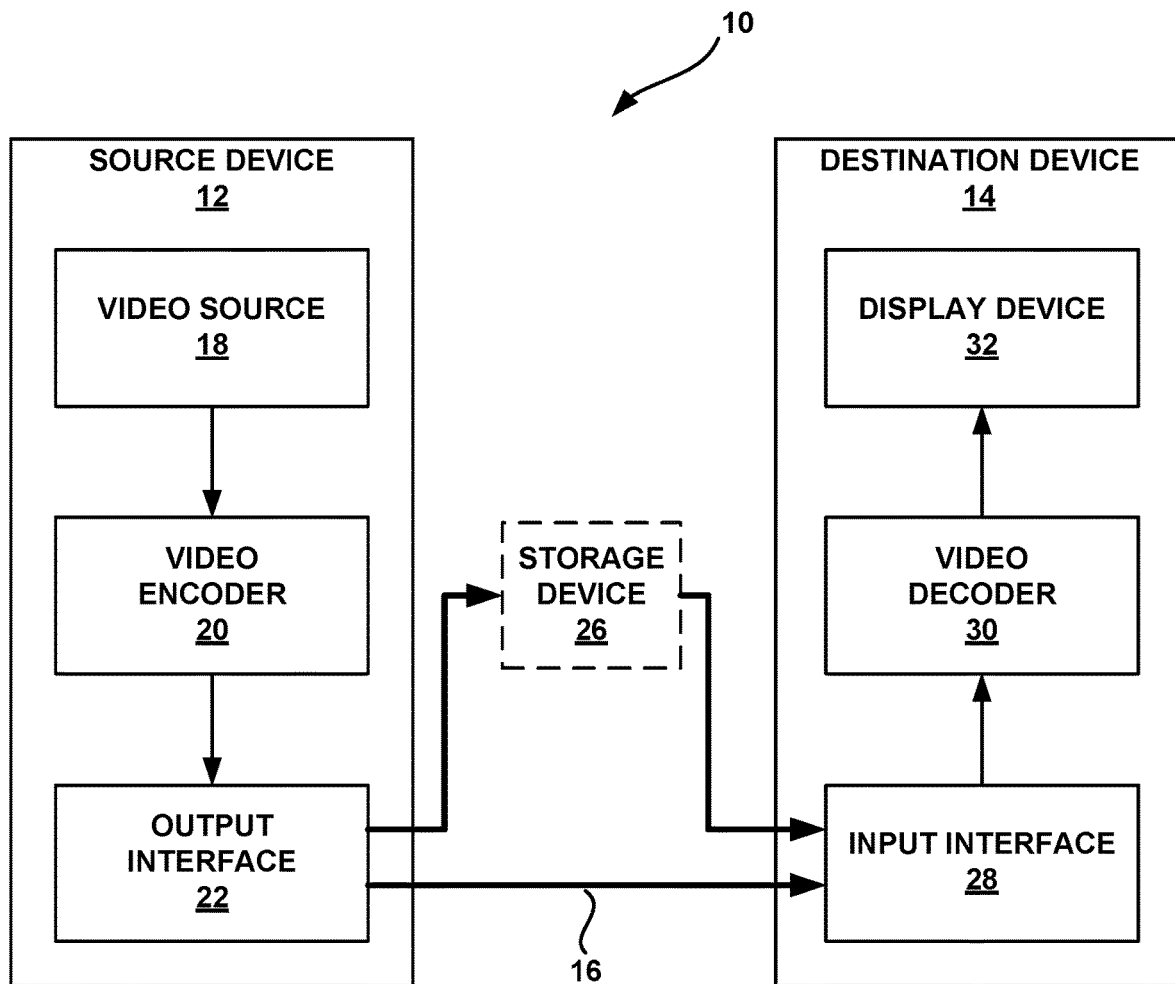
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a me server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard. Video encoder 20 and video decoder 30 may also operate according to one or more of the various extensions to HEVC, including the Scalable Video Coding (SVC) extension, the Multi-view Video Coding (MVC) extension, and the Screen content coding (SCC) extension.

Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Other examples of video coding standards include ITU-T H.261, ISO/IEC MPEG-1 Visual, ITU-T H.262, and ISO/IEC MPEG-2 Visual, ITU-T H.263. Examples of proprietary video codecs include Google VP8, VP9, VP10, and video codecs developed by other organizations such as the Alliance for Open Media. The techniques of this disclosure, however, are not limited to any particular coding standard.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC, including extensions of HEVC as well as next generation standards, including the new H.266 standard presently under development.

The Joint Video Exploration Team (JVET) test model (also known as the Joint Exploration Model or JEM) is a test model for a future video coding standard. In JEM, the basic encoding and decoding flowchart of HEVC is kept unchanged, but the design elements of some modules, including the modules for block structure, intra and inter prediction, residue transform, loop filter and entropy coding, are modified. JEM also introduces new coding tools.

Although not shown in FIG. 1, in some aspects, video encoder 20 and video decoder 30 may each be integrated with an audio encoder and audio decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. Thus, in instances where a CU has one PU, the terms CU and PU may be conceptually identical. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For example, video decoder 30 may decode a current CU of a picture of the video data. In this example, as part of decoding the current CU, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU, thereby decoding the current CU. By reconstructing the coding blocks for each CU of a picture, video decoder 30 may reconstruct the picture.

For each block, a set of motion information can be available to video encoder 20 and/or video decoder 30. As used herein, each respective "set of motion information" contains motion information for forward-direction and backward-direction prediction. As used herein, the forward and backward prediction directions represent two prediction directions of a bi-directional prediction mode, and as such, the terms "forward" and "backward" are not necessarily limited to particular geometric meanings. Instead "forward" and "backward" directions correspond to two reference picture lists, namely, reference picture list 0 (RefPicList0) and reference picture list 1 (RefPicList1) of a current picture. In cases where only one reference picture list is available for a picture or slice, only RefPicList0 is available and the motion information of each block of a slice is always forward.

In some cases, video decoder 30 may use a motion vector together with the motion vector's reference index (in the reference picture list) in decoding processes. Video encoder 20 may also use the motion vector and the corresponding reference index in decoding, such as in a decoding loop or reconstruction loop. A motion vector with the associated reference index is denoted as a "uni-predictive" set of motion information. For each prediction direction, the motion information contains a reference index and a motion vector. In some cases, for simplicity, a motion vector itself may be referred to in a way that it is assumed that it has an associated reference index. A reference index is used to identify a reference picture in the current reference picture list (RefPicList0 or RefPicList1). Each motion vector has a horizontal and a vertical component.

Picture order count (POC) values are widely used in video coding standards to identify the position of a picture in display order. Although there may be cases within two pictures within one coded video sequence that have the same POC value, such instances are rare. When multiple coded video sequences are present in a bitstream, pictures with a same POC value may be positioned closer to each other in terms of decoding order. Video decoder 30 (and in some instances, video encoder 20) may use POC values of pictures for one or more of reference picture list construction, reference picture set(s) derivation as in HEVC, and/or motion vector scaling.

Aspects of video coding according to AVC are discussed in the following paragraphs. In H.264/AVC, each inter macroblock (MB) may be partitioned into four different ways, namely:
One 16×16 MB partition
Two 16×8 MB partitions
Two 8×16 MB partitions
Four 8×8 MB partitions Different MB partitions in one MB may have different reference index values for each direction (RefPicList0 or RefPicList1). When an MB is not partitioned into four 8×8 MB partitions, video encoder 20 and/or video decoder 30 may use only one motion vector for each MB partition in each direction.

When an MB is partitioned into four 8×8 MB partitions, each 8×8 MB partition can be further partitioned into sub-blocks, each of which can have a different motion vector in each direction. There are four different ways to obtain sub-blocks from an 8×8 MB partition, namely:
One 8×8 sub-block
Two 8×4 sub-blocks
Two 4×8 sub-blocks
Four 4×4 sub-blocks In the case of sub-blocks obtained from partitioning of an 8×8 MB, each sub-block can have a different motion vector in each direction. Therefore, in the case of sub-blocks obtained from partitioning of an 8×8 MB, video encoder 20 and/or video decoder 30 may use a motion vector is present in a level equal to or higher than the sub-block.

In AVC, video encoder 20 and/or video decoder 30 may enable temporal direct mode could be enabled in either MB or MB partition level for skip or direct mode in B slices. For each MB partition, the motion vectors of the block co-located with the current MB partition in the RefPicList1[0] of the current block are used to derive the motion vectors. Each motion vector in the co-located block is scaled based on POC distances. In AVC, a direct mode can also predict motion information from the spatial neighbors.

Aspects of video coding according to HEVC are described in the following paragraphs. In HEVC, the largest coding unit in a slice is referred to as a coding tree block (CTB). A CTB contains a quad-tree the nodes of which are coding units. The size of a CTB can range from 16×16 to 64×64 in the HEVC main profile (although 8×8 CTB sizes can also be supported). A coding unit (CU) may be the same size of a CTB although and as small as 8×8. Each CU is coded according to one coding mode. If a CU is inter coded, it may be further partitioned into two (2) or four (4) prediction units (PUs), or may become just one PU when further partitioning does not apply. If two PUs are present in one CU, the PUs can be equally-sized rectangles (at half the size of the CU), or differently-sized size rectangles with a quarter (¼) and three-quarters (¾) the size of the CU. If the CU is inter coded, one set of motion information is present for each PU. In addition, each PU is coded with a unique inter-prediction mode to derive the set of motion information.

With respect to motion prediction in HEVC, in the HEVC standard, there are two inter prediction modes. The two inter prediction modes are named merge mode (skip mode is considered as a special case of merge) and advanced motion vector prediction (AMVP) mode, respectively, for a given PU. In either AMVP or merge mode, video encoder 20 and video decoder 30 may maintain a motion vector (MV) candidate list, with multiple motion vector predictors in the respective MV candidate list. Video encoder 20 and video decoder 30 may generate the motion vector(s), as well as reference indices in the case of merge mode, of the current PU, by taking one candidate from the MV candidate list.

The MV candidate list may contain up to five (5) candidates for the merge mode, and only two (2) candidates for the AMVP mode. A merge candidate may contain a set of motion information, e.g., motion vectors corresponding to both reference picture lists (list 0 and list 1) and the reference indices. According to merge mode coding, if a merge candidate is identified by a merge index, then video encoder 20 and video decoder 30 may use the reference pictures for the prediction of the current blocks, as well as for determining the associated motion vectors. As described above, a merge candidate corresponds to a full set of motion information while an AMVP candidate contains just one motion vector for a specific prediction direction and reference index.

In contrast, under AMVP mode, for each potential prediction direction from either list 0 or list 1, video encoder 20 explicitly signals a reference index, together with an MVP index to the MV candidate list, because the AMVP candidate contains only a motion vector. In AMVP mode, the predicted motion vectors can be further refined. As such, under AMVP mode, video decoder 30 may receive, in the encoded video bitstream, for each prediction direction, a reference index and an MVP index. The reference index for the prediction direction indicates a reference picture in a reference picture list for the prediction direction. The MVP index for the prediction direction indicates a candidate in the MV candidate list for the prediction direction. The candidates for both merge mode and AMVP mode are derived similarly from the same spatial neighboring blocks and a temporal neighboring block.

When the video coder is a video encoder, the techniques may further include storing the video data in a memory of a wireless communication device, processing the video data on one or more processors of the wireless communication device, and transmitting the video data from a transmitter of the wireless communication device. The wireless communication device may, for example, include a telephone handset, and the telephone handset may transmit the video data at the transmitter of the wireless communication device by modulating, according to a wireless cot standard, a signal comprising the video data.

Figure 2:
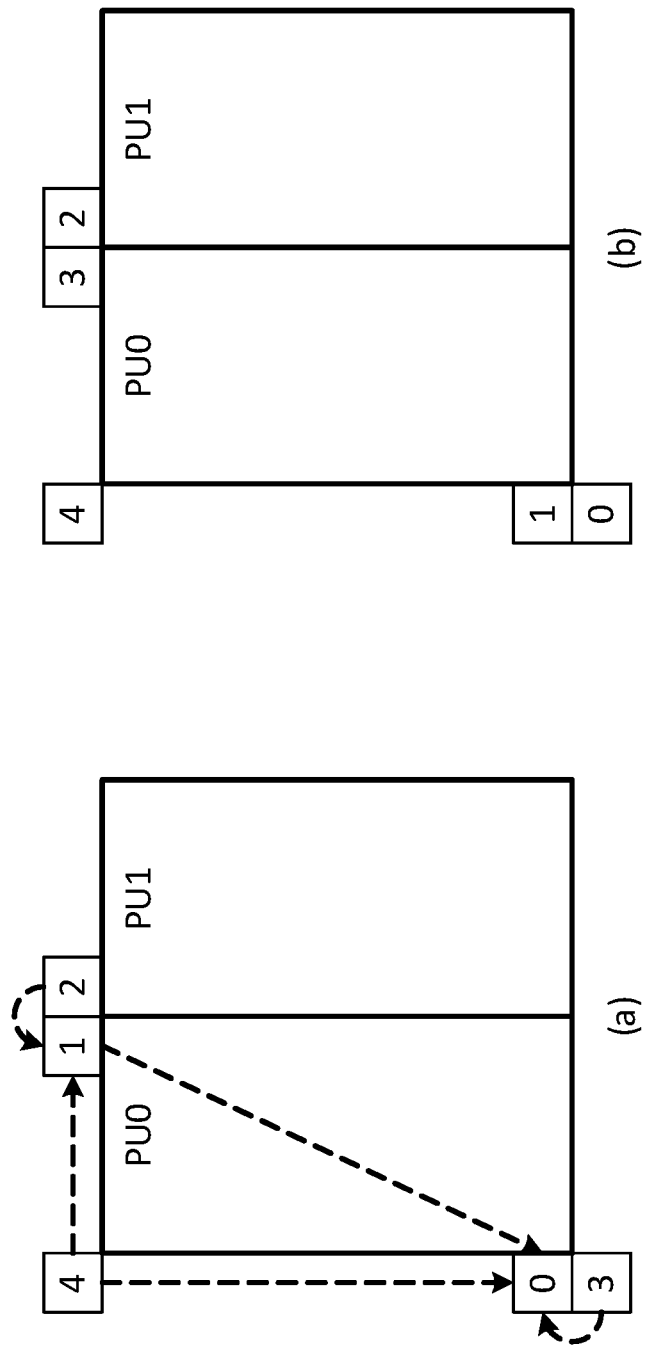
FIG. 2 is a block diagram illustrating spatial motion vector candidate derivation using neighboring blocks, with respect to both merge mode and advanced motion vector prediction (AMVP) mode video coding.

FIG. 2 is a block diagram illustrating spatial MV candidate derivation using neighboring blocks, with respect to both merge mode and AMVP mode video coding. FIG. 2 illustrates spatial MV candidate derivation from the neighboring blocks shown for a specific PU (PU0). The techniques for generating the candidates from the blocks differ between merge mode and AMVP mode. According to merge mode, video encoder 20 and video decoder 30 may derive up to four spatial MV candidates according to the ordering shown in the (a) section of FIG. 2 with numbers. That is, the order illustrated for merge mode spatial MV generation in FIG. 2 is as follows: left (0), above (1), above-right (2), below-left (3), and above-left (4), as shown in the (a) section of FIG. 2.

The (b) section of FIG. illustrates the ordering of spatial MV candidate derivation with respect to AMVP mode. According to AMVP mode, video encoder 20 and video decoder 30 may divide the neighboring blocks into two groups, namely, a left group consisting of blocks 0 and 1, and an above group consisting of blocks 2, 3, and 4, as shown in the (b) section of FIG. 2. For each group, the potential candidate in a neighboring block referring to the same reference picture as the reference picture indicated by the reference index signaled by video encoder 20 has the highest priority to be chosen by video decoder 30 to form a final candidate of the group. In some cases, none of the neighboring blocks contains a motion vector pointing to the same reference picture as the reference picture indicated in the data signaled by video encoder 20. In such a case, i.e., if video decoder 30 cannot find a candidate that is a neighboring block referring to the same reference picture as indicated in the signaled index, video decoder 30 may scale the first available candidate to form the final candidate, and thus, the temporal distance differences can be compensated.

Figure 3:
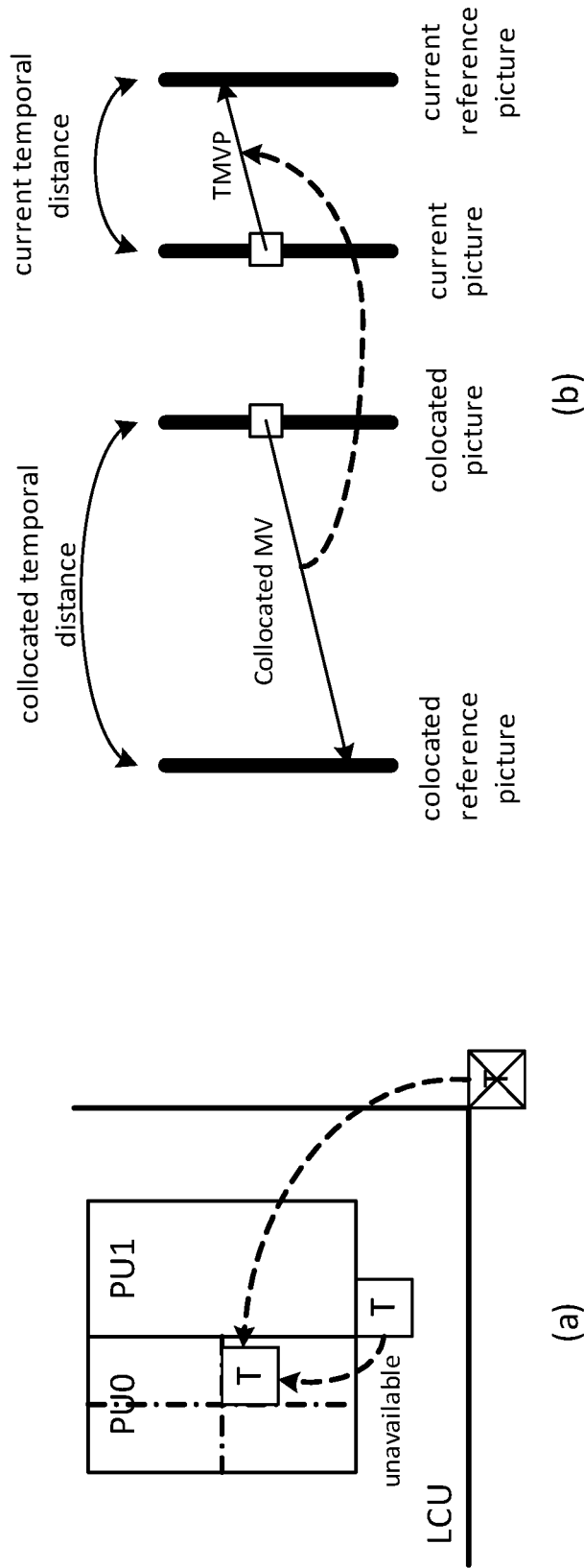
FIG. 3 is a block diagram illustrating temporal motion vector predictor (TMVP) candidate derivation and MV scaling, with respect to both merge mode and AMVP mode video coding.

FIG. 3 is a block diagram illustrating temporal MV predictor (TMVP) candidate derivation and MV scaling, with respect to both merge mode and AMVP mode video coding. Video encoder 20 and video decoder 30 may add a TMVP candidate to an MV candidate list (whether for merge mode or AMVP mode coding), if the TMVP is enabled and available. More specifically, video encoder 20 and video decoder 30 may add the TMVP (if enabled and available) to the MV candidate list after adding all of the spatial MV candidates to the list. The process of motion vector derivation for the TMVP candidate is the same for both merge mode and AMVP mode.

However, with respect to merge mode, video encoder 20 always sets the target reference index for the TMVP candidate in the merge mode to zero (0) and signals the reference index of (0) in cases where the TMVP reference index is signaled. The primary block location for TMVP candidate derivation is the bottom right-block outside of the collocated PU as shown in the (a) section of FIG. 3 as block "T." Using the bottom-right block for TMVP derivation may compensate for skew or bias toward the above and left blocks introduced by using the above and left blocks to generate the spatial neighboring candidates.

However, if the bottom-right block outside the collocated PU is located outside of the current row of coding tree blocks (CTBs), or if motion information is not available for the bottom-right block outside the collocated PU, then video encoder 20 and video decoder 30 may substitute the block with a center block of the PU. The substitution use-case scenario is illustrated in the (a) side of FIG. 3, by way of dashed-line arrows pointing to the center block of PU0. The motion vector for the TMVP candidate is derived from the co-located PU of the co-located picture, indicated at the slice level. Similar to temporal direct mode in AVC, a motion vector of the TMVP candidate motion vector scaling which is performed to compensate the distance differences. Aspects of TMVP scaling, applicable to both merge mode and AMVP mode coding, are illustrated in the (b) section of FIG. 3.

Aspects of merge candidate list generation in HEVC are discussed in the following paragraphs. As shown in the (a) section of FIG. 2, the order of spatial neighbor selection for merge mode is the following: left (0), above (1), above right (2), below left (3). If one of the above-listed candidates is unavailable, video encoder 20 and video decoder 30 may check the above left candidate (4) illustrated in the (a) section of FIG. 2. Then, video encoder 20 and video decoder 30 may check the temporal candidate as shown in FIG. 3, by first checking the bottom-right block, and if the bottom-right block is not available, then checking the center block.

If the list size is less than five (<5) candidates, video encoder 20 and video decoder 30 may add additional candidates to fix the list size, i.e., to bring the list size up to equal five (5). Other aspects of motion prediction in HEVC include motion vector scaling, artificial motion vector candidate generation, and the pruning process for candidate insertion into the list(s). These aspects may apply, in various scenarios, to both merge and AMVP modes.

With respect to motion vector scaling, an assumption is that the value of the motion vectors is proportional to the distance of pictures in the presentation time. A motion vector associates two pictures, namely, the reference picture and the picture containing the motion vector (also referred to as the "containing picture"). If video encoder 20 and video decoder 30 use a motion vector to predict the other motion vector, video encoder 20 and video decoder 30 may calculate the distance between the containing picture and the reference picture based on the POC values of the containing picture and the reference picture.

For a motion vector to be predicted, both the containing picture and the reference picture may be different. Therefore, video encoder 20 and video decoder 30 may calculate a new distance, based on the POC values of the containing picture and the reference picture. In turn, video encoder 20 and video decoder 30 may scale the motion vector based on the distance between these two POC values. For a spatial neighboring candidate, the containing pictures for the two motion vectors are the same, while the reference pictures are different. In HEVC, motion vector scaling applies to both TMVP and AMVP for spatial and temporal neighboring candidates.

With respect to artificial motion vector candidate generation, if a motion vector candidate list is not complete, then video encoder 20 and video decoder 30 may generate artificial motion vector candidates, and insert the artificial motion vector candidates at the end of the list, until the list includes the requisite number of candidates for the respective mode (merge or AMVP).

Merge mode coding provides for two types of artificial MV candidates: combined candidate derived only for B-slices and zero candidates. AMVP mode-based coding only uses zero candidates as artificial MV candidates. For each pair of candidates that are already in the candidate list and have necessary motion information, video encoder 20 and video decoder 30 may derive bi-directional combined motion vector candidates by a combination of the motion vector of the first candidate referring to a picture in the list 0 and the motion vector of a second candidate referring to a picture in the list 1.

A pruning process for candidate insertion refers to a process by which video encoder 20 and video decoder 30 deal with candidates that happen to be the same (e.g., having identical motion information), but are derived from different blocks. The redundancy of identical candidates being included in a candidate list decreases the efficiency of the merge or AMVP candidate list. To mitigate or eliminate the reduced efficiency caused by having identical candidates in a list, video encoder 20 and video decoder 30 may apply a pruning process, by which video encoder 20 and video decoder 30 compare one candidate against one or more other candidates in the current candidate list. In turn, video encoder 20 and video decoder 30 may eliminate all instances beyond the first instance of the identical candidates, based on the comparison. In this way, video encoder 20 and video decoder 30 may avoid inserting identical candidates in a given candidate list, at least to a certain extent. To reduce the computational complexity of pruning, video encoder 20 and video decoder 30 may apply only a limited number of pruning process instances, instead of comparing each potential candidate with all of the other existing candidates.

Various motion-prediction technologies of NET are discussed below. In the contribution titled "TE12: Performance of Partition Based Illumination Compensation (PBIC)", document JCTVC-C041, Partition Based Illumination Compensation (PBIC) was described. PBIC is different from weighted prediction (WP), in which video encoder 20 and video decoder 30 may enable/disable WP, and video encoder 20 signals WP parameters at the slice level. In contrast, according to PBIC, video encoder 20 and video decoder 30 may enable/disable illumination compensation (IC), and video encoder 20 may signal IC parameters at the PU level to handle local illumination variation. Similar to WP, a scaling factor (also denoted by a) and an offset (also denoted by h) are used in IC, and the shift number is fixed to be six (6).

Video encoder 20 may encode an IC flag for each PU, where the IC flag indicates whether or not IC applies for a current PU. In turn, video encoder 20 may signal the encoded IC flag for each PU to video decoder 30. If IC applies for the current PU (i.e., if the IC flag is set to a true value for the current PU), then video encoder 20 may signal a set of IC parameters (i.e., a and b) to video decoder 30. The IC parameters are used for motion compensation. In cases of bi-prediction, video encoder 20 may signal two scaling factors (one for each prediction direction) and one offset to video decoder 30. To reduce bitrate (e.g., by saving bits spent on signaling IC parameters), video encoder 20 may use the same scaling factors for the chroma component as for with the luma component, and may use a fixed offset value of one hundred twenty eight (128).

In 3D-HEVC, IC is enabled for inter-view prediction. Different from WP and PBIC (in which IC parameters are signaled explicitly), 3D-HEVC-based IC derives IC parameters based on neighboring samples of a current CU and the neighboring samples of the reference block. In 3D-HEVC, IC applies to the 2N×2N partition mode only. For AMVP mode, video encoder 20 may signal one IC flag for each CU that is predicted from the inter-view reference picture. For merge mode, to reduce bitrate, video encoder 20 may signal the IC flag only in cases where the merge index of the PU is not equal to zero (0). IC does not apply to any CU that is only predicted from temporal reference pictures.

Derivation of IC parameters is discussed below. A linear IC model used in inter-view prediction is shown in equation (1) below:

$$p(i,j)=a*r(i+dv_x,j+dv_y)+b, \text{ where } (i,j) \in PU_c \quad (1)$$

In equation (1) above, $PU_c$ is the current PU, (i,j) is the coordinate set for pixels in $PU_c$, $(dv_x, dv_y)$ is the disparity vector (which is used to identify blocks in different views corresponding to the same objects for inter-view coding) of $PU_c$, p(i,j) is the prediction of $PU_c$, and r is the PU's reference picture from neighboring view. In equation (1) above, a and b are parameters of the linear IC model. The disparity vector $PU_c$, $(dv_x, dv_y)$ i is associated with 3D video coding and inter-view prediction.

Figure 4:
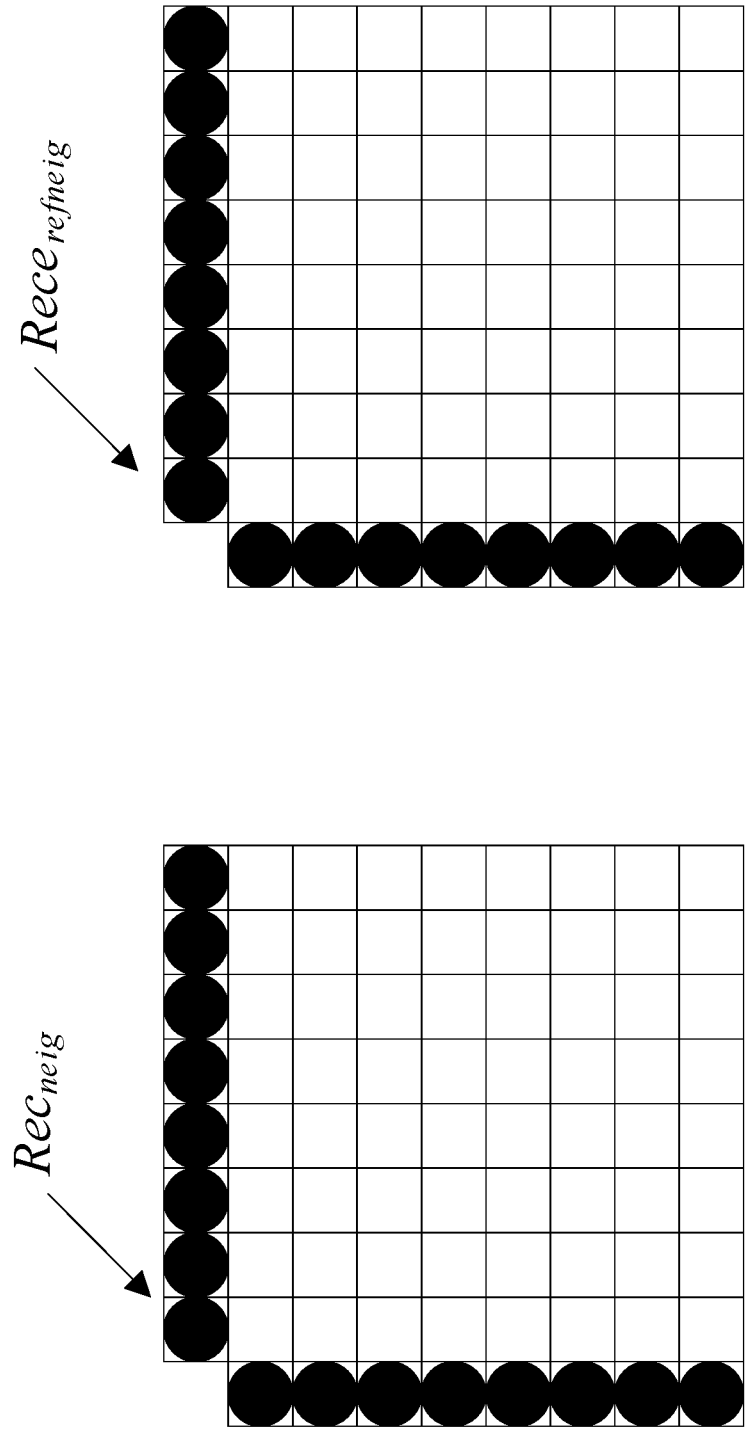
FIG. 4 is a block diagram illustrating the use of neighboring pixels to estimate parameters in accordance with the illumination compensation (IC) model.

FIG. 4 is a block diagram illustrating the use of neighboring pixels to estimate parameters in accordance with the illumination compensation (IC) model. Video encoder 20 and video decoder 30 may find the reference block (shown on the right in FIG. 4) of the current CU (shown on the left in FIG. 4) using the disparity vector of the current PU. To estimate parameters a and b for a PU, video encoder 20 and video decoder 30 may use two sets of pixels as shown in FIG. 4. That is, video encoder 20 and video decoder 30 may use: (1) a set of available reconstructed neighboring pixels in the leftmost column and the topmost row of the current CU (i.e. the CU that contains the current PU), and (2) a set of corresponding neighboring pixels (i.e., the leftmost column and the topmost row) of the reference block of the current CU. Video encoder 20 and video decoder 30 may locate the reference block of the current CU by using the current PU's disparity vector.

Let $Rec_{neig}$ and $Rec_{refneig}$ denote used neighboring pixel set of the current CU and its reference block respectively, and let 2N denote the pixel number in $Rec_{neig}$ and $Rec_{refneig}$. Then, a and b can be calculated according to equations (2) and (3) below:

$$a = \frac{2N \cdot \sum_{i=0}^{2N-1} Rec_{neig}(i) \cdot Rec_{refneig}(i) - \sum_{i=0}^{2N-1} Rec_{neig}(i) \cdot \sum_{i=0}^{2N-1} Rec_{refneig}(i)}{2N \cdot \sum_{i=0}^{2N-1} Rec_{refneig}(i) \cdot Rec_{refneig}(i) - \left(\sum_{i=0}^{2N-1} Rec_{refneig}(i)\right)^2} \quad (2)$$

$$b = \frac{\sum_{i=0}^{2N-1} Rec_{neig}(i) - a \cdot \sum_{i=0}^{2N-1} Rec_{refneig}(i)}{2N} \quad (3)$$

In some cases, only a is used in the linear model and b is always set equal to zero (0). In other cases, only b is used in the linear model, and a is always set equal to one (1).

Aspects of weighted prediction are discussed below. HEVC supports weighted prediction (WP), where a scaling factor (denoted by a), a shift number (denoted by s) and an offset (denoted by b) are used in motion compensation. Supposing the pixel value in position (x, y) of the reference picture is p(x, y), then p'(x, y)=((a*p(x, y)+(1<<(s−1)))>>s)+b is used (instead of p(x, y)) as the prediction value in motion compensation.

When WP is enabled, video encoder 20 may signal a flag for each reference picture of current slice, to indicate whether or not WP applies for the respective reference picture. If WP applies for a given reference picture (i.e., if the flag is set to a 'true' value (i.e., the value 'true')), video encoder 20 may signal a set of WP parameters (i.e., a, s, and b) to video decoder 30, and the set of WP parameters may be used for motion compensation from the reference picture. To flexibly turn WP on or off for luma and chroma components, video encoder 20 may signal the WP flag and WP parameters separately for luma and chroma components. According to WP, the same set (i.e., just one set) of WP parameters is used for all pixels in one reference picture.

Figure 5:
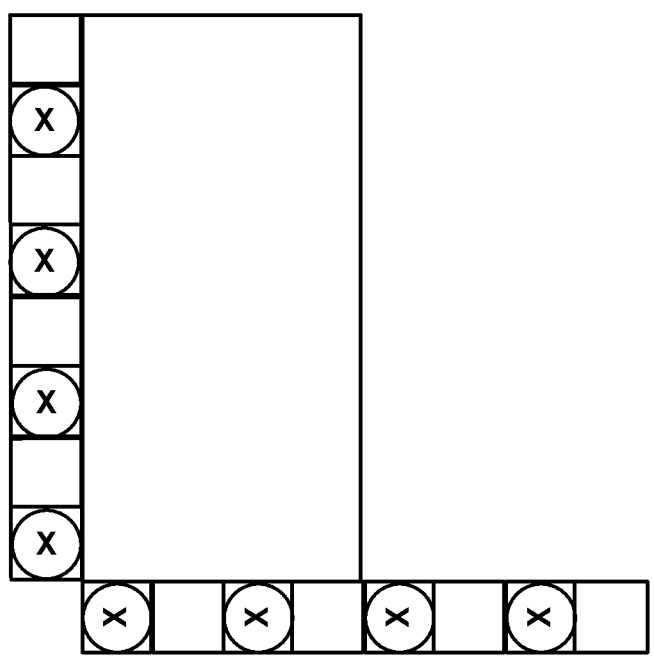
FIG. 5 is a block diagram illustrating examples of neighboring samples used for deriving parameters for certain types of illumination compensation.
Figure 5:
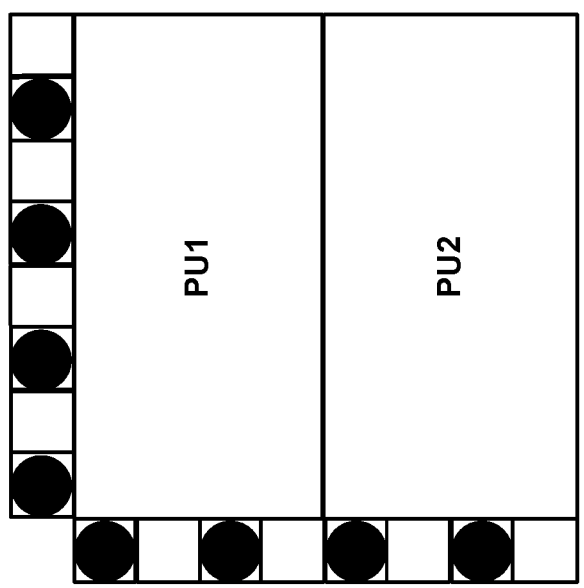

FIG. 5 is a block diagram illustrating examples of neighboring samples used for deriving parameters for certain types of illumination compensation. The drawing on the left side of FIG. 5 represents a current CU, and the drawing on the right side of FIG. 5 represents a reference block of PU1 included in the current CU. Solid darkened circles (used in the drawing of the current CU on the left side in FIG. 5) represent neighboring samples of the current CU, while circles marked with an 'X' (used in the drawing of the reference block of PU1 in list0 on the right side in FIG. 5) represent neighboring samples of the reference block.

Local illumination compensation (LIC) is a video coding tool that video encoder 20 and video decoder 30 can utilize. In JEM, LIC is developed based on a linear model for illumination changes, using a scaling factor a and an offset b. LIC can be enabled or disabled, and the enabled/disables status may map to the value of a flag of each inter-mode CU. When LIC is applied for a CU, video encoder 20 and video decoder 30 may employ a least square error method to derive the parameters a and b, using the neighboring samples of the current CU and the corresponding reference samples. More specifically, as illustrated in FIG. 5, video encoder 20 and video decoder 30 may use the subsampled neighboring samples of the CU and the corresponding pixels (identified by motion information of the current CU or sub-CU) in the reference picture. The subsampling format for the current CU is a 2:1 subsampling format. The IC parameters are derived and applied for each prediction direction separately.

If a CU is coded (that is, encoded and decoded) according to merge mode, then video encoder 20 and video decoder 30 may copy the LIC flag for the CU from neighboring blocks, in a way similar to motion information copying in merge mode. Otherwise, video encoder 20 may signal an LIC flag to video decoder 30 for the CU, to indicate whether or LIC applies to the encoded CU. When LIC is applied to a CU, the predicted signal in direction k is generated by $$\text{pred}_{LIC}(i,j,k) = a \cdot \text{pred}(i,j,k) + b \quad (4)$$

where $\text{pred}_{LIC}(i,j,k)$ represents the finally predicted signal in reference list k (k=0 or 1) and pred(i,j,k) represents the predicted signal based on some inter-prediction information such as reference index and motion vector information from reference list k. Video encoder 20 and video decoder 30 may derive parameters a and b by minimizing regression error between neighboring reconstructed and predicted samples around the current block.

One example implementation of LIC will now be described, although the techniques of this disclosure are not limited to any particular implementation of LIC and may be compatible with other implementations. In this example implementation, for each inter-mode coded CU, video encoder 20 may explicitly signal a one-bit flag, or video decoder 30 may implicitly derive the value of the one-bit flag, with respect to the usage of LIC for the inter-mode coded CU. In cases where the flag is set to a 'true' value, video decoder 30 may implicitly derive LIC parameters for each PU or sub-PU belonging to the CU. That is, video decoder 30 may implicitly derive the LIC parameters for each PU or sub-PU by using neighboring samples of the current CU (shown using darkened circles in the left-side drawing of FIG. 5) and the corresponding pixels in the reference picture (shown using circles marked with an 'X' in the right-side drawing of FIG. 5). Investigations into LIC have shown that significant, bitrate saving can be achieved on sequences with illumination variance, as provided by LIC.

Figure 6:
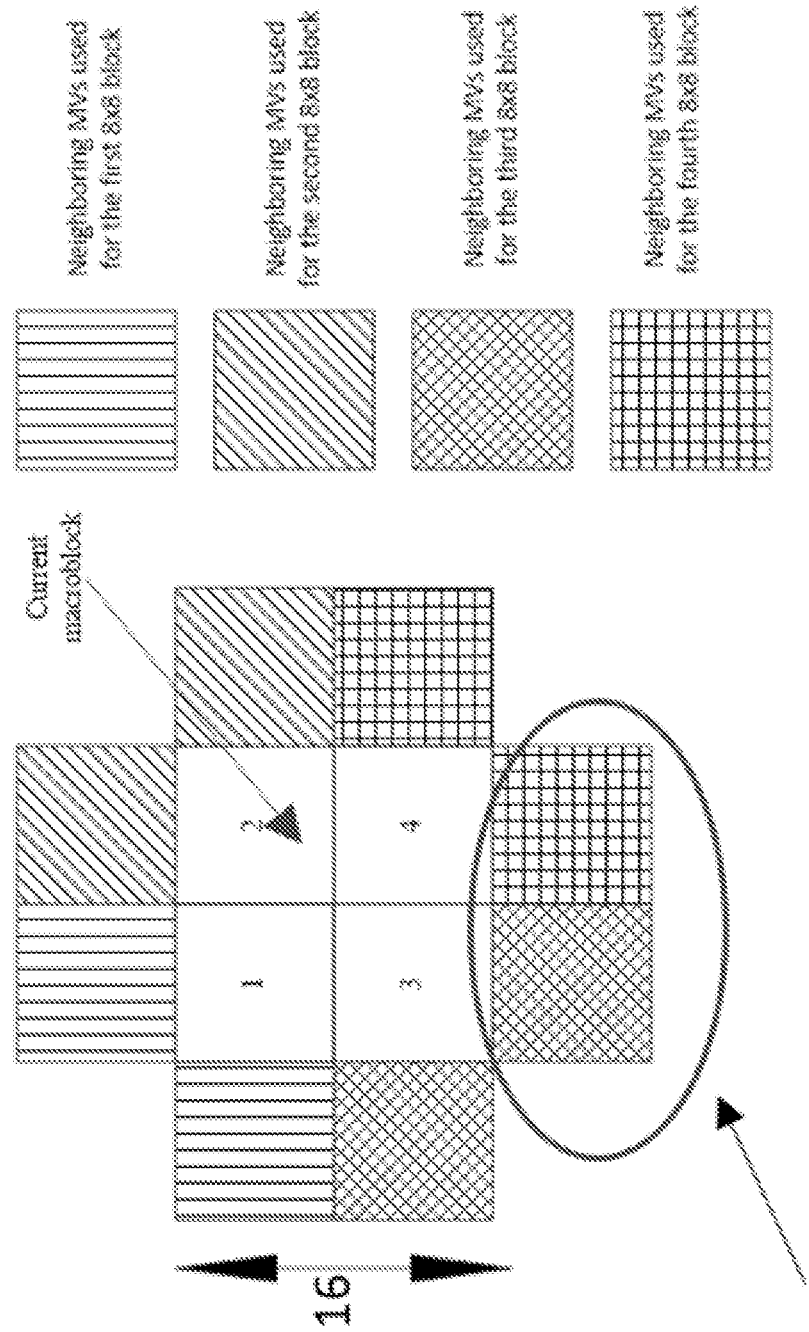
FIG. 6 is a conceptual diagram illustrating aspects of overlapped block motion compensation (OBMC) according to the H.263 video coding standard.

FIG. 6 is a conceptual diagram illustrating aspects of overlapped block motion compensation (OBMC) according to H.263. OBMC was proposed in the development of H.263. Video encoder 20 and video decoder 30 may perform OBMC on 8×8 blocks, and may use motion vectors of two connected neighboring 8×8 blocks for a current block, as shown in FIG. 6. For example, for the first 8×8 block in a current macroblock, besides the current 8×8 block's own motion vector, video encoder 20 and video decoder 30 may also apply the above and left neighboring motion vectors to generate two additional prediction blocks. In this way, each pixel in the current 8×8 block may have three prediction values, and video encoder 20 and video decoder 30 may use the weighted average of the three prediction values as the final prediction for each respective pixel in the current 8×8 block.

In cases where a neighboring block is not coded, or is intra coded, video encoder 20 and video decoder 30 determine that the neighboring block does not have an available motion vector. In these scenarios, video encoder 20 and video decoder 30 may use the motion vector of the current 8×8 block as the neighboring motion vector. Meanwhile, for the third and fourth 8×8 blocks of the current macroblock (as shown in FIG. 6), video encoder 20 and video decoder 30 may never use the below neighboring block. In other words, for each macroblock (MB), video encoder 20 and video decoder 30 may use no motion information from MBs below the current MB to reconstruct the pixels of the current MB, during the OBMC process.

Figure 7:
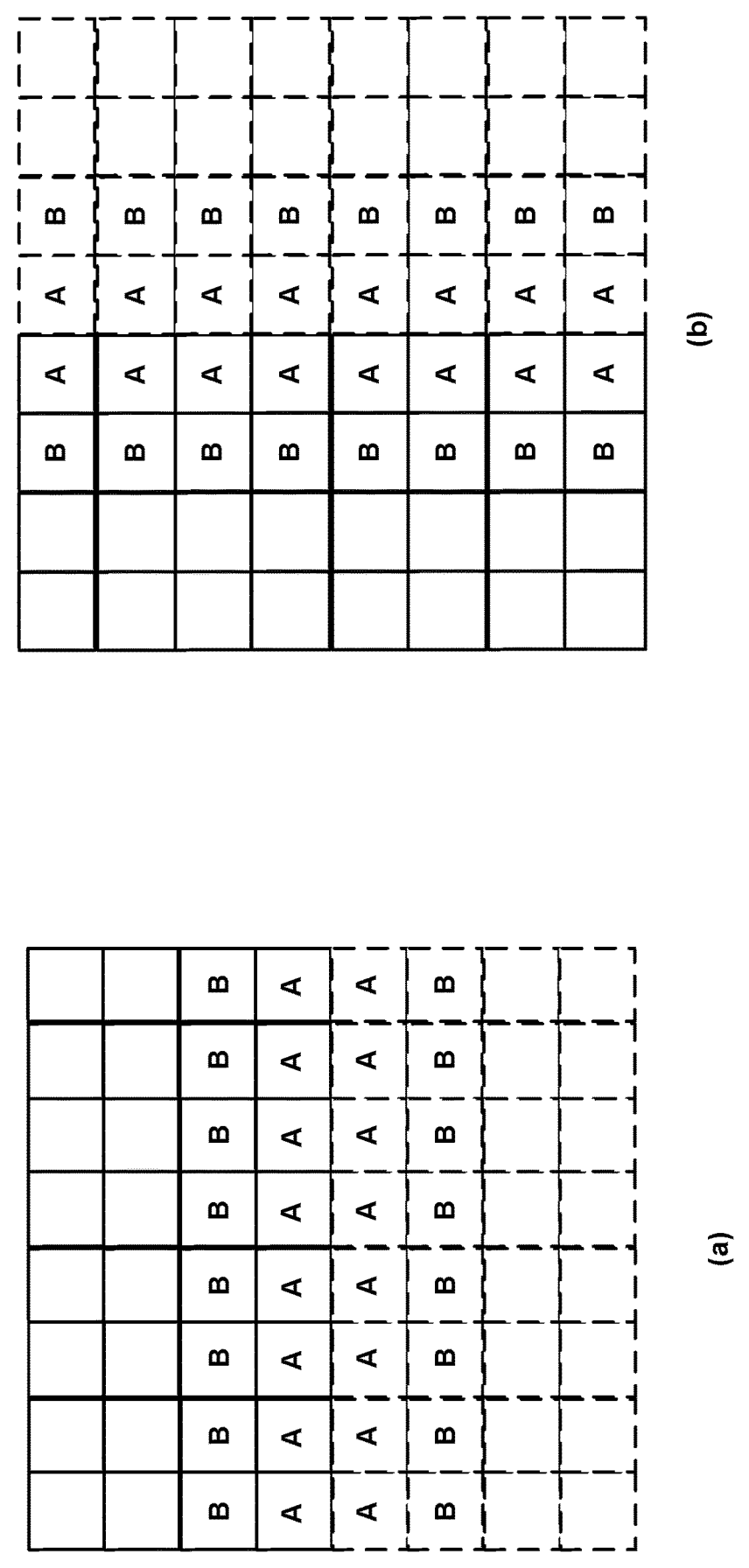

FIG. 7 is a conceptual diagram illustrating aspects of OBMC according to HEVC. In the development of HEVC, OBMC was proposed to smooth the PU boundary. The (a) section and (b) section of FIG. 7 each illustrates a CU that includes two PUs. In both the (a) section and (b) section of FIG. 7, the pixels with solid-line boundaries belong to PU0, while the pixels with dashed-line boundaries belong to PU1. As shown in FIG. 7, if a CU contains two or more PUs, then video encoder 20 and video decoder 30 may use OBMC to smooth lines and/or columns near the PU boundary. For pixels marked with "A" or "B" in PU0 or PU1 of FIG. 7, video encoder 20 and video decoder 30 may generate two prediction values. For instance, video encoder 20 and video decoder 30 may generate the prediction values for the pixels marked "A" or "B" by applying motion vectors of PU0 and PU1 respectively, and using the weighted average of the prediction values as the final prediction for the respective pixel.

Figure 8:
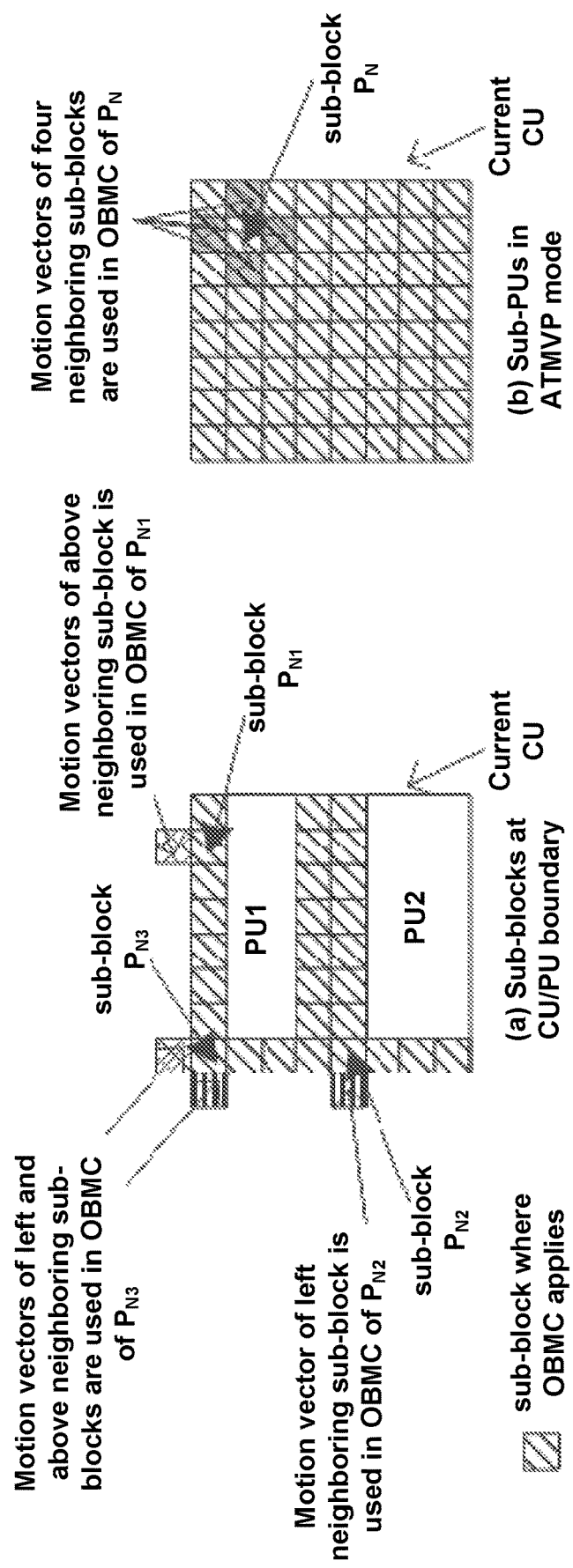
FIG. 8 is a conceptual diagram illustrating sub-blocks where OBMC applies, in accordance with sub-prediction unit (sub-PU) level OBMC techniques.

FIG. 8 is a conceptual diagram illustrating sub-blocks where OBMC applies, in accordance with sub-PU level OBMC techniques. Sub-PU level OBMC is applied in the current JEM configuration. According to the sub-PU level OBMC of JEM, OBMC is performed for all Motion Compensated (MC) block boundaries except the right and bottom boundaries of a CU. Moreover, according to the sub-PU level OBMC of JEM, video encoder 20 and video decoder 30 may apply OBMC for both luma and chroma components. In HEVC, an MC block corresponds to a PU. In JEM, when a PU is coded with a sub-PU mode, each sub-block of the PU is an MC block. To process CU/PU boundaries in a uniform fashion, video encoder 20 and video decoder 30 may perform OBMC at a sub-block level for all MC block boundaries, with the sub-block size set equal to 4×4, as illustrated in FIG. 8.

When OBMC applies to the current sub-block, in addition to the current motion vectors, video encoder 20 and video decoder 30 may also use the motion vectors of four connected neighbouring sub-blocks, if available and not identical to the current motion vector, to derive a prediction block for the current sub-block. Video encoder 20 and video decoder 30 may weight the multiple prediction blocks based on multiple motion vectors, to generate the final prediction signal of the current sub-block.

The discussion below denotes a prediction block based on motion vectors of a neighboring sub-block as $P_N$, with N indicating an index for the neighboring above, below, left and right sub-blocks, and denotes the prediction block based on motion vectors of the current sub-block as $P_C$. If $P_N$ belongs to the same PU as $P_C$ (and thus contains the same motion information), video encoder 20 and video decoder 30 do not perform the OBMC from $P_N$. Otherwise, video encoder 20 and video decoder 30 may add every pixel of $P_N$ to the same pixel in $P_C$. That is, if $P_N$ does not belong to the same PU as $P_C$, four rows/columns of $P_N$ are added to $P_C$.

Video encoder 20 and video decoder 30 may use the weighting factors $\{1/4, 1/8, 1/16, 1/32\}$ for $P_N$ and may use the weighting factors $\{3/4, 7/8, 15/16, 31/32\}$ for $P_C$. The exceptions are small MC blocks, (e.g., when PU size is equal to 8×4, 4×8 or a PU is coded with Advanced Temporal Motion Vector Prediction (ATMVP) mode), for which video encoder 20 and video decoder 30 may add only two rows/columns of $P_N$ to $P_C$. In these cases, video encoder 20 and video decoder 30 may use weighting factors $\{1/4, 1/8\}$ for $P_N$ and may use weighting factors $\{3/4, 7/8\}$ for $P_C$. For a $P_N$ generated based on motion vectors of vertically neighboring sub-block(s), video encoder 20 and video decoder 30 may add pixels in the same row of $P_N$ to $P_C$ with a same weighting factor. For a $P_N$ generated based on motion vectors of horizontally neighboring sub-block(s), video encoder 20 and video decoder 30 may add pixels in the same column of $P_N$ to $P_C$ with a same weighting factor.

For PU boundaries, video encoder 20 and video decoder 30 may apply OBMC on each side of the boundary. As shown in FIG. 8, OBMC can be applied along the boundary between PU1 and PU2 twice. First, OBMC is applied with PU2's MV to the dashed-line-bordered blocks along the boundary inside PU1. Second, OBMC is applied with PU1's MV to the dashed-line-bordered blocks along the boundary inside PU2. In contrast, OBMC is applied to one side of CU boundaries, because when coding the current CU, the already-coded CUs cannot be changed.

Figure 9A:
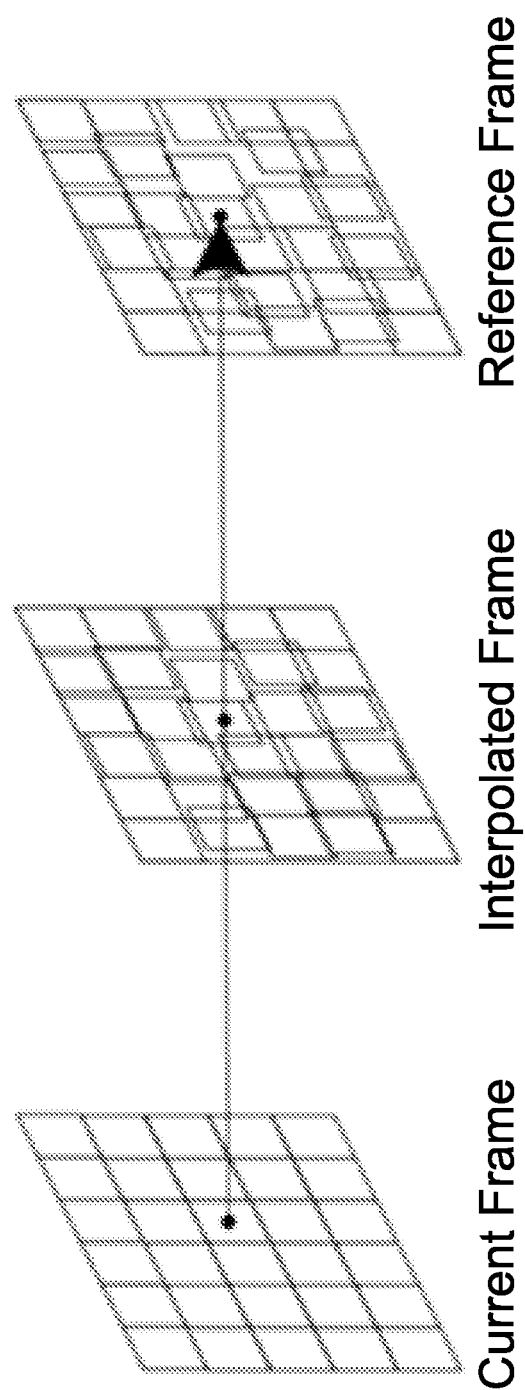
FIGS. 9A and 9B are conceptual diagrams illustrating examples of motion estimation for frame rate up-conversion technologies.
Figure 9B:
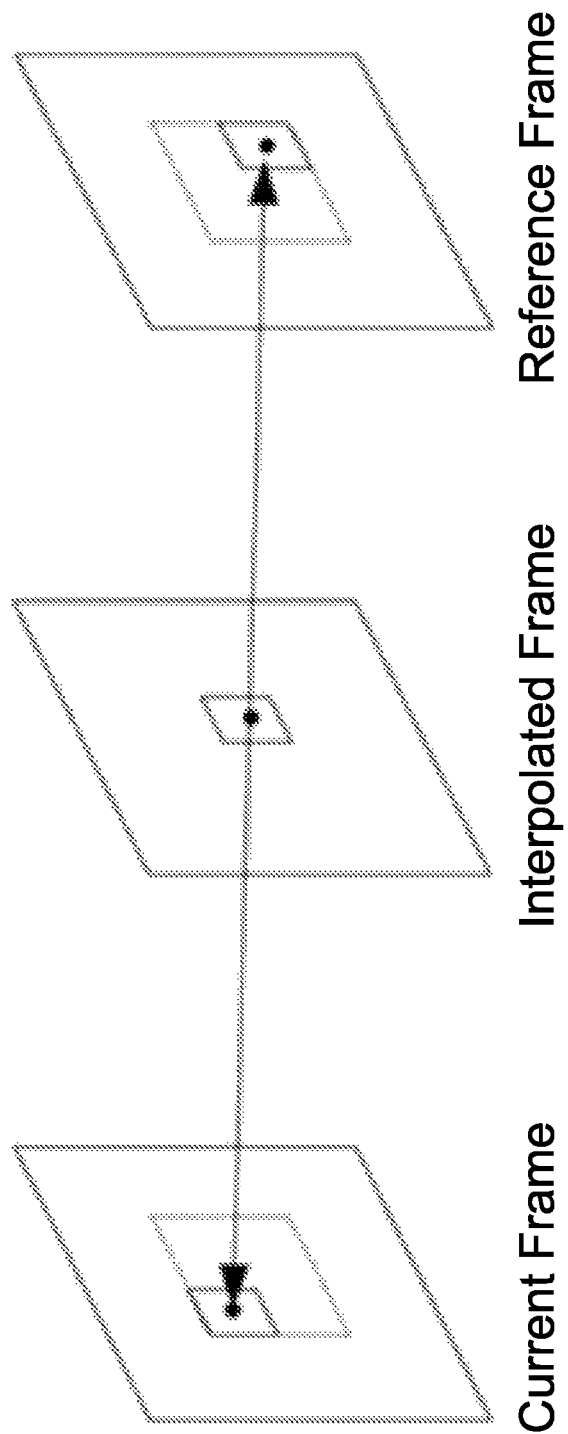

FIGS. 9A and 9B are conceptual diagrams illustrating examples of motion estimation for frame rate up-conversion technologies. Frame rate up-conversion (FRUC) technologies are used to generate high-frame-rate videos based on low-frame-rate videos. FRUC has been widely used in the display industry. FRUC algorithms can be divided into two types. One type of FRUC algorithms interpolates intermediate frames by simple frame repetition or averaging. In some instances, this type of FRUC algorithm may provide improper results in a picture that contains a relatively high amount of motion. The other type of FRUC algorithm, called motion-compensated FRUC (MC-FRUC), considers object movement when it generates intermediate frames. MC-FRUC techniques consist of two steps, namely, motion estimation (ME), and motion-compensated interpolation (MCI). The ME portion of MC-FRUC generates motion vectors (MVs), which represent object motion using vectors. The MCI portion of MC-FRUC uses MVs to generate intermediate frames.

The block-matching algorithm (BMA) is widely used for ME in MC-FRUC, because the BMA is relatively simple to implement. According to the BMA, video encoder 20 may divide an image into blocks, and detect the movement of the resulting blocks. Two kinds of ME are primarily used for BMA, namely unilateral ME and bilateral ME. FIG. 9A illustrates unilateral ME for FRUC. According to unilateral ME, video encoder 20 may obtain MVs by searching for the best matching block from a reference frame of the current frame. Then, video encoder 20 may locate the block on the motion trajectory in the interpolated frame, so that the MV is obtained.

As shown in FIG. 9A, three blocks in three frames are involved, to follow the motion trajectory. Although the block in the current frame belongs to a coded block in FIG. 9A, the best matching block in the reference frame may not fully belong to a coded block, nor does the block in the interpolated frame that falls along the motion trajectory. Consequently, overlapped regions of the blocks and un-filled regions (holes) may occur in the interpolated frame.

To handle overlaps, simple FRUC algorithms involve averaging and overwriting the overlapped pixels. Moreover, holes are covered by the pixel values from the reference or the current frame. However, these simple FRUC algorithms may result in blocking artifacts and/or blurring. Hence, motion field segmentation, successive extrapolation using the discrete Hartley transform, and image inpainting have been proposed, to potentially handle holes and overlaps without increasing blocking artifacts and/or blurring.

FIG. 9B illustrates bilateral ME for FRUC. As shown in FIG. 9B, bilateral ME is another solution (in MC-FRUC) that can be used to avoid the problems caused by overlaps and holes. According to bilateral MF, video encoder 20 obtains MVs passing through a block in the intermediate frame using the temporal symmetry between blocks of the reference and current frames. As a result, when implementing bilateral ME, video encoder 20 does not generate overlaps or holes. Because the current block is assumed to be the block that is being processed, according to a certain order, e.g., as in the case of video coding, a sequence of such blocks would cover the entirety of the intermediate picture without overlap. For example, in the case of video coding, video encoder 20 and video decoder 30 may process blocks in the decoding order. Therefore, such a technique may be more suitable if FRUC concepts can be incorporated into a video coding framework.

Figure 10:
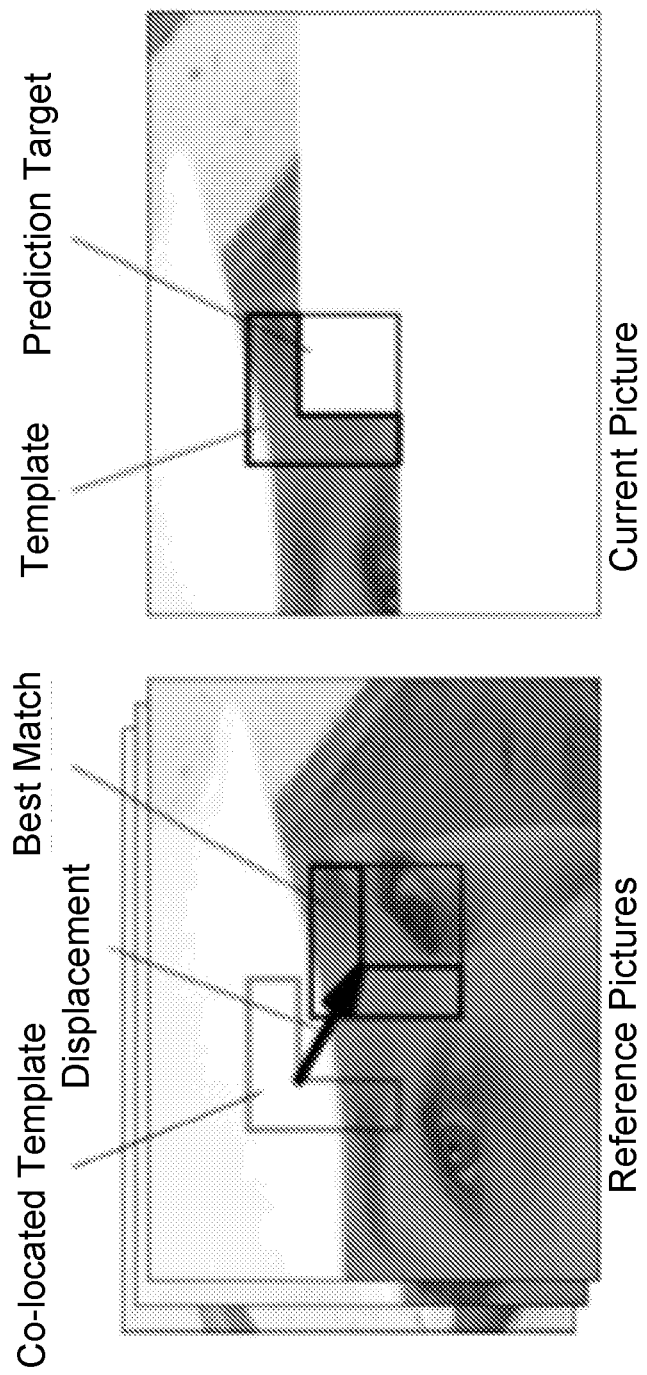
FIG. 10 is a diagram illustrating aspects of decoder side motion vector derivation.

FIG. 10 is a diagram illustrating aspects of decoder side motion vector derivation. One type of decoder side motion derivation (DMVD) is template matching-based DMVD, which is illustrated in FIG. 10. With the continual advancement of video codecs, the percentage of bits dedicated to motion information in bitstreams continues to increase. DMVD was proposed in an effort to reduce the bit cost of motion information. Template matching based DMVD yielded a significant coding efficiency improvement. Template matching techniques are illustrated in FIG. 10. According to the template matching techniques illustrated in FIG. 10, instead of searching best match for the prediction target, which is the current block being processed by video decoder 30, video decoder 30 may search for the best match of template in the reference frame. Assuming the template and the prediction target are from the same object, video decoder 30 may use the motion vector of the template as the motion vector of the prediction target.

Because the template matching is conducted at both video encoder 20 and video decoder 30, the motion vector can be derived at the decoder side, to avoid signaling cost. In other words, by implementing DVMD, video decoder 30 may reduce the bit count of the bitstream that video encoder 20 signals, because video encoder 20 may eliminate a number of bits that would otherwise be used to signal motion information. In this way, DMVD may reduce bandwidth consumption in video coding technology.

Figure 11:
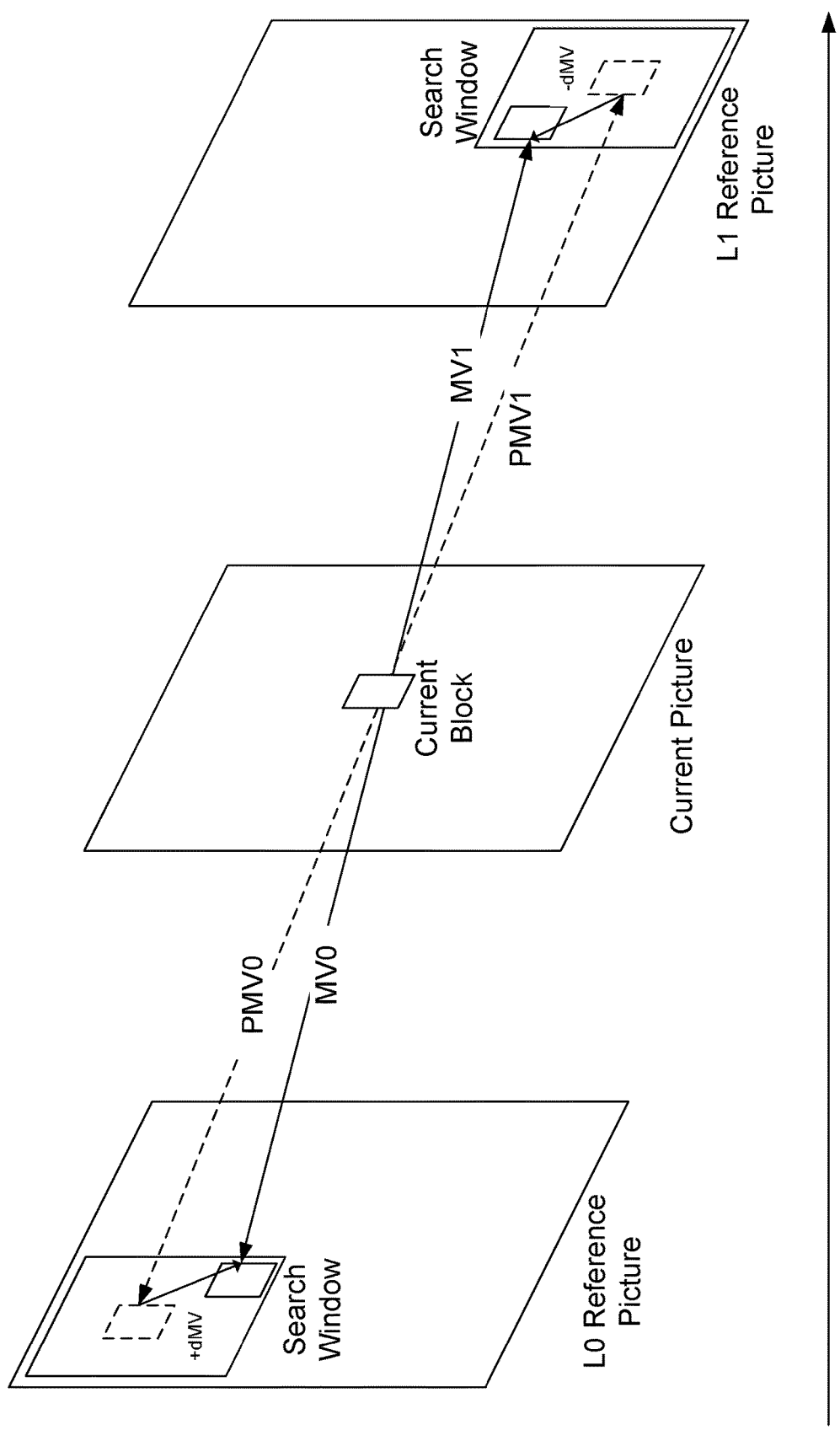
FIG. 11 is a conceptual diagram illustrating aspects of mirror-based bi-directional motion vector derivation in decoder side motion vector derivation.

FIG. 11 is a conceptual diagram illustrating aspects of mirror-based bi-directional motion vector derivation in decoder side motion vector derivation. Mirror-based bi-directional MV derivation is another category of DMVD, in addition to the DMVD categories discussed above. Aspects of mirror-based bi-directional MV derivation are similar to bilateral ME in FRUC. Mirror-based MV derivation is applied using centro-symmetic motion estimation around search centers with fractional sample accuracy.

According to mirror-based bi-directional MV derivation for DMVD, video encoder 20 may predefine and signal the size and/or location of a search window in the encoded video bitstream. In FIG. 11, "dMV" represents an offset which video encoder 20 may add to PMV0 and subtract from PMV1 to generate a MV pair consisting of MV0 and MV1. Video encoder 20 may check all of the values of dMV inside the search window, and may use the Sum of Absolute Difference (SAD) between the L0 and L1 reference blocks as the measurement of centro-symmetric motion estimation.

Video encoder 20 may select the MV pair with the minimum SAD as the output of the centro-symmetric motion estimation. Because mirror-based bi-directional MV derivation may need a future reference (e.g., a reference at a temporal position later than the current frame in decoding order) and an earlier reference (e.g., a reference at a temporal position earlier than the current frame in decoding order) for the SAD matching, it cannot be applied to P frame or low-delay B frames in which only the former reference is available.

In proposals related to mirror-based bi-directional MV derivation, it was further proposed to combine the mirror-based bi-directional MV derivation with merge mode in HEVC. In the proposed combination of mirror-based bi-directional MV derivation and merge mode coding, video encoder 20 may encode and signal a flag called "pu_dmvd_flag" for a PU of B slices to indicate whether DMVD mode is applied to the current PU. Because DMVD mode does not explicitly cause video encoder 20 to transmit any MV information in the bitstream, the decoding process may integrate the pu_dmvd_flag with the syntax of merge mode in the HEVC decoding process.

Figure 12:
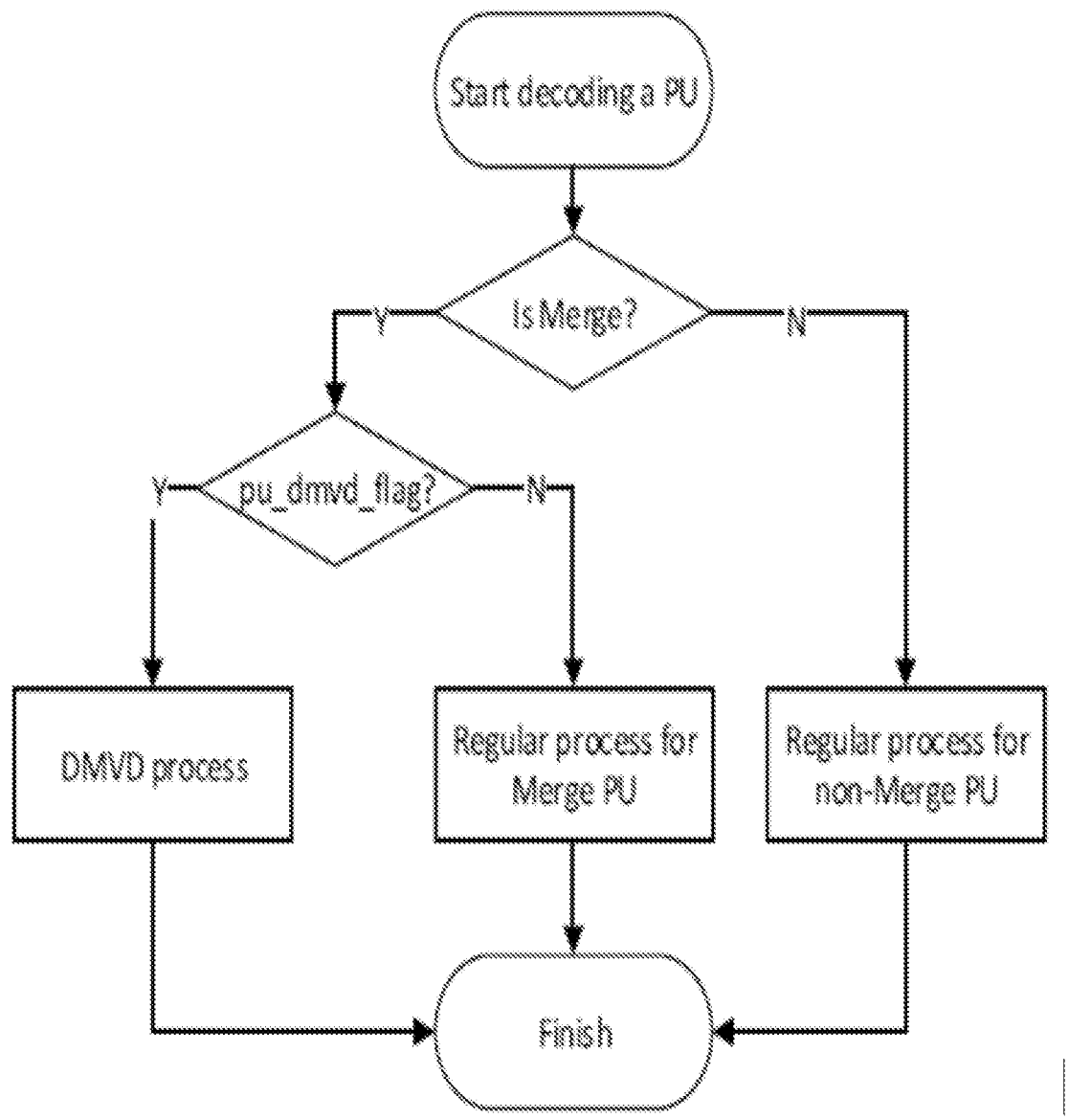
FIG. 12 is a flowchart illustrating a decoding process by which a video decoding device may integrate a pu_dmvd_flag with the syntax of merge mode according to an HEVC-compliant decoding process.

FIG. 12 is a flowchart illustrating a decoding process by which video decoder 30 may integrate the pu_dmvd_flag with the syntax of merge mode according to an HEVC-compliant decoding process. That is, the flowchart of FIG. 12 illustrates an example process of PU decoding, with the pu_dmvd_flag added. According to a modification of merge candidate derivation, two additional merge candidates were introduced to improve coding performance. According to this modification to merge candidate derivation, video encoder 20 and video decoder 30 may split PUs into square N×N sub-PUs (e.g. N may be set to 4). Video encoder 20 and video decoder 30 may derive the motion vectors of the sub-PUs recursively, following raster scan order.

Figure 13:
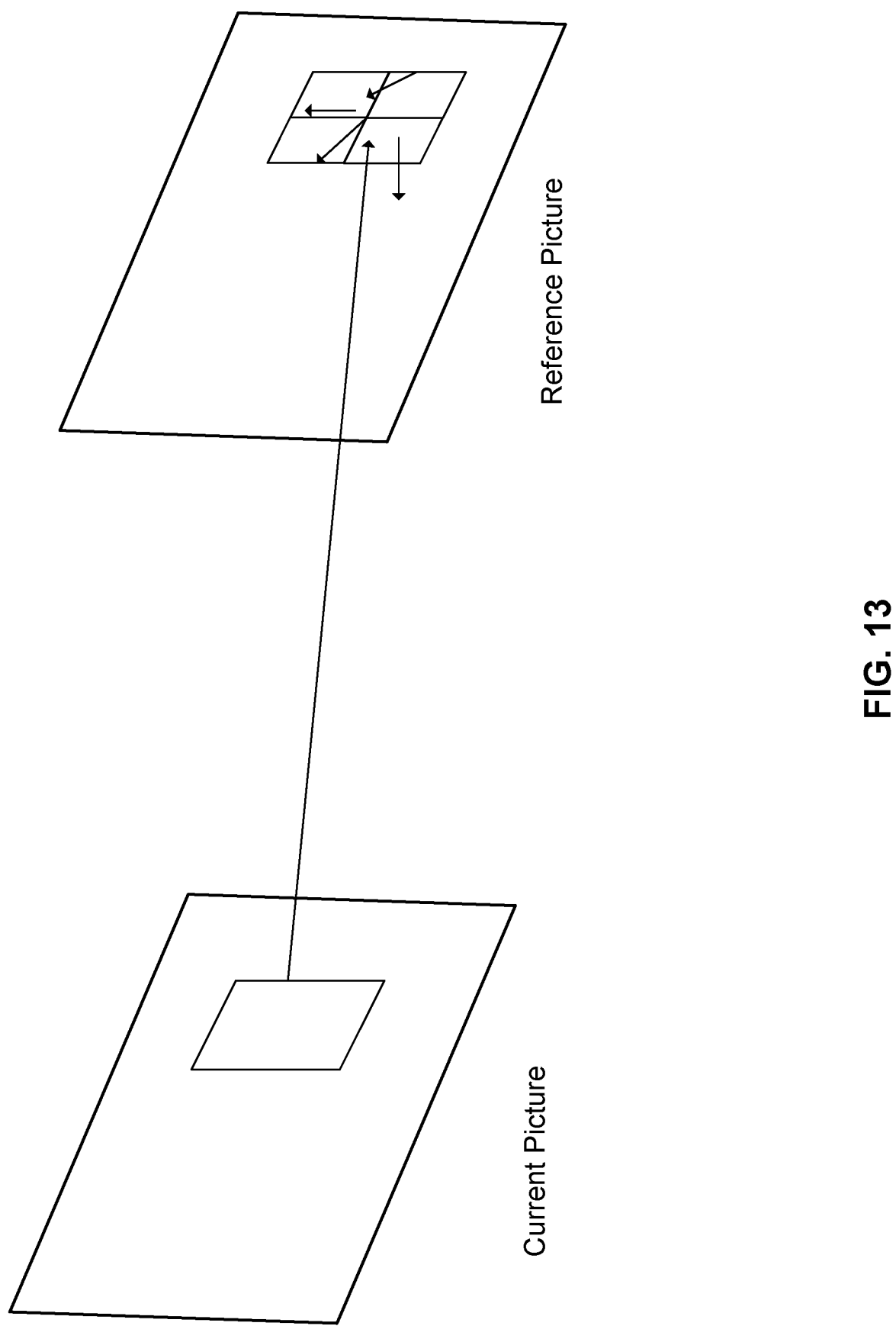
FIG. 13 is a conceptual diagram illustrating sub-PU motion prediction from a reference picture, in accordance with advanced temporal motion vector prediction.

FIG. 13 is a conceptual diagram illustrating sub-PU motion prediction from a reference picture, in accordance with advanced temporal motion vector prediction. Advanced temporal motion vector prediction (ATMVP) was proposed to allow video coding devices to obtain multiple sets of motion information (including motion vectors and reference frames) for each PU. The motion information in ATMVP comes through only from the reference pictures. To derive a temporal motion vector according to ATMVP for the current PU, the first step is determining where the temporal motion vectors to be fetched. Performance of the first step finds the first available motion vector in five neighboring blocks in the following order: left, above, above-right, left-bottom, and above-left.

The definition of the five neighboring blocks for ATMVP is the same as spatial merge candidates of the current PU. To avoid the repetitive scanning process of neighboring blocks, video encoder 20 and video decoder 30 may only find the motion vector of the first merge candidate in the already-derived merge candidate list, to determine from where to fetch the temporal motion vector. The PUs are split into square N×N sub-PUs (e.g., with N set to a value of 4). Video encoder 20 and video decoder 30 may derive the motion vectors of the sub-PUs recursively, following raster scan order.

Figure 14:
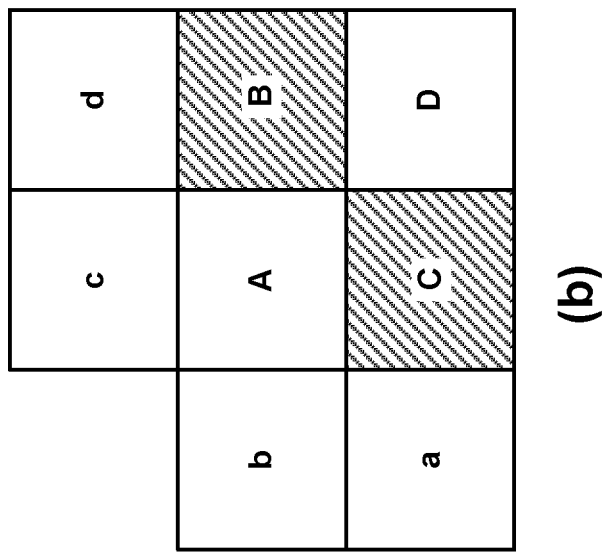
FIG. 14 is a diagram illustrating an example of a PU with four sub-blocks and some of the neighboring blocks of the PU.
Figure 14:
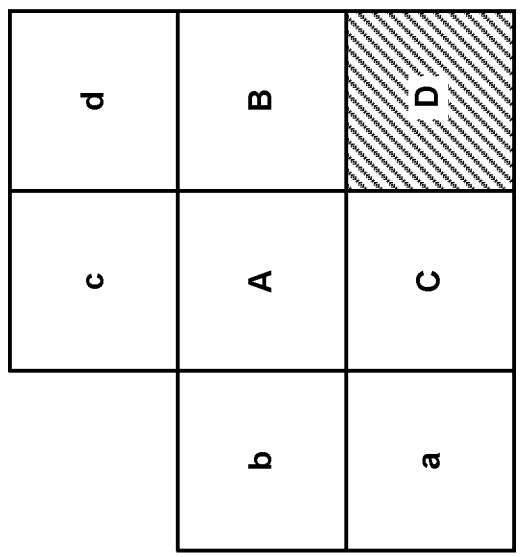

FIG. 14 is a diagram illustrating an example of a PU with four sub-blocks and some of the neighboring blocks of the PU. In some implementations of merge mode coding, video encoder 20 and video decoder 30 may derive a spatio-temporal motion vector predictor as an additional candidate. The spatio-temporal motion vector predictor (SPMVP) considers not only the temporal motion vector predictors, but also the spatial motion vector predictors. By averaging motion information of two spatial motion vector predictor and one temporal motion vector predictor, video encoder 20 and video decoder 30 may generate an additional merge candidate for each sub-PU, to achieve further BjØntegaard delta (BD) rate reduction. The BI) rate corresponds to the average bit rate difference (expressed as a percentage) for the same peak signal-to-noise ratio (PSNR).

For the derivation of the SPMVP candidate, video encoder 20 and video decoder 30 use two spatial neighbors and one temporal motion predictor, to derive the motion vectors in each sub-PU of the current PU. Section (a) of FIG. 14 illustrates aspects of the derivation process of the SPMVP candidate. As shown in section (a) of FIG. 14, video encoder 20 and video decoder 30 may split the PU into square N×N sub-PUs (e.g., N may be set to a value of 4). Video encoder 20 and video decoder 30 may derive the motion vectors of the sub-PUs recursively, according to a raster scan order. Considering an 8×8 PU which contains four 4×4 sub-PUs labeled A, B, C, and D in FIG. 14, the neighboring N×N blocks in the current frame are labeled as a, b, c, and d in FIG. 14.

To derive the motion of sub-PU A, video encoder 20 and video decoder 30 may use two spatial neighbors (b and c) and one temporal motion predictor (D). The proposed derivation for SPMVP is shown in section (b) of FIG. 14. The SPMVP derivation technique uses two spatial neighbors (b and c) and two temporal motion predictors (B and C) to derive the motion of sub-PU "A."

Merge candidate list generation according to various techniques described above and as shown in the in the (a) section of FIG. 2 can be described as follows, with the order being as follows: left (0), above (1), above right (2), below left (3).

Check ATMVP candidate.
Check STMVP candidate.
If one of them is unavailable, check above left (4).
Then, check the temporal candidate as shown in FIG. 3, check the bottom-right at first, and if the bottom-right is not available, then check the center block.
If the list size is less than seven (<7), add additional candidates to fix the list size to be equal to 7.

Figure 15:
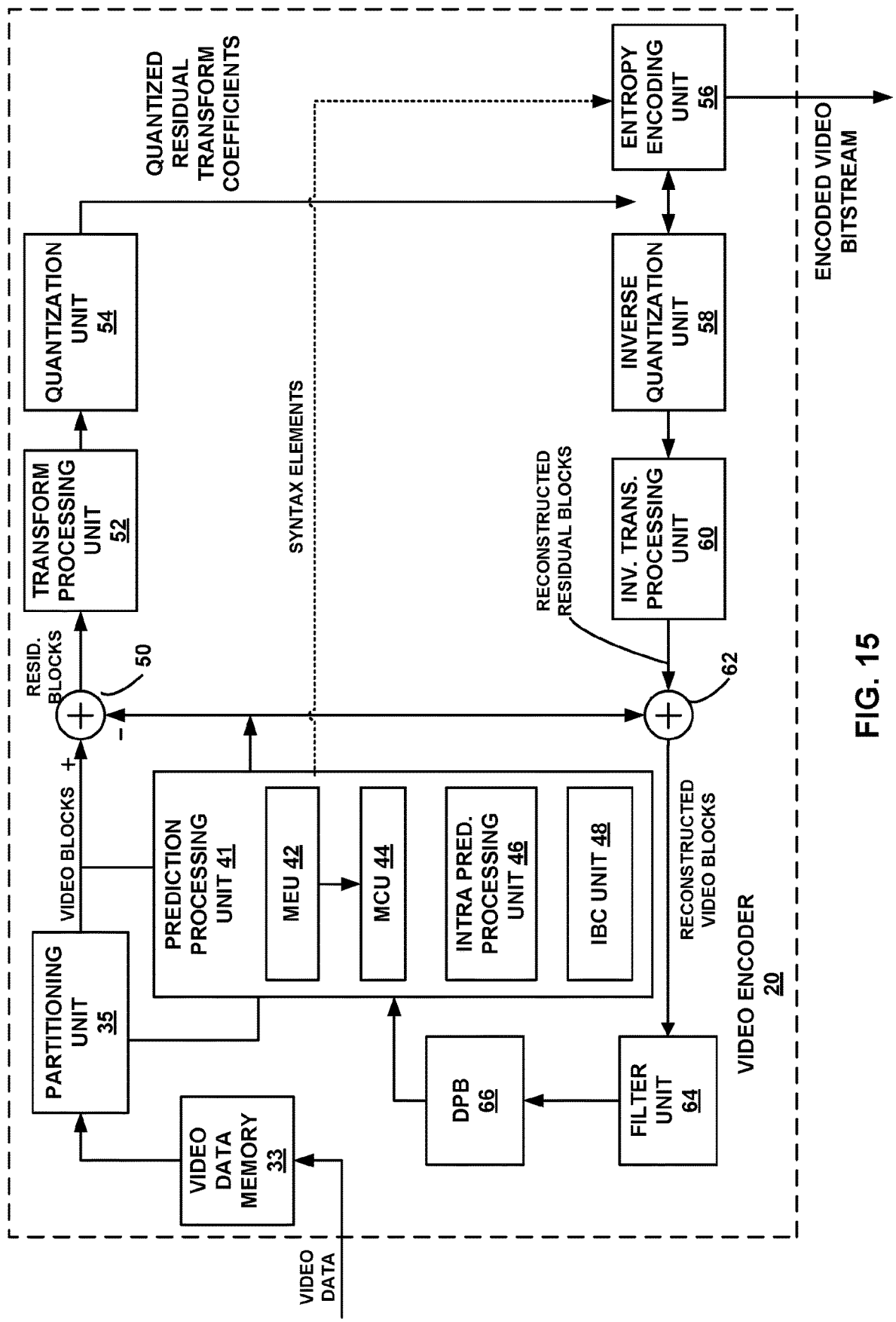
FIG. 15 is a block diagram illustrating an example video encoder that may implement the techniques described in this disclosure.

FIG. 15 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 15, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, intra prediction processing unit 46, and intra block copy (IBC) unit 48. Although shown separately in FIG. 15 for ease of explanation, it should be understood that MEU 42, MCU 44, intra prediction processing unit 46, and IBC unit 48 may in fact be highly integrated. For video block reconstruction, video encoder 20 also includes inverse quantization unit 58, inverse transform processing unit 60, summer 62, filter unit 64, and decoded picture buffer (DPB) 66.

As shown in FIG. 15, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and, in conjunction with prediction processing unit 41, partitions the video data into video blocks. This partitioning may also include partitioning into slices, tiles, or other larger units, as wells as video block partitioning, e.g., according to a quadtree structure of LCUs and CUs. Although shown separately for purposes of example, partitioning unit 35 and prediction processing unit 41 may be highly integrated, and both partitioning unit 35 and prediction processing unit 41 may perform aspects of the process of determining how to partition a picture of video. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. For some CUs, intra prediction processing unit 46 may encode blocks as described above. MEU 42 and MCU 44 within prediction processing unit 41 perform inter-predictive coding of the current video block relative to one or more predictive blocks in one or more reference pictures to provide temporal compression. Motion estimation, performed by MEU 42, is the process of generating motion vectors, which estimate motion for video blocks. A motion vector, for example, may indicate the displacement of a PU of a video block within a current video frame or picture relative to a predictive block within a reference picture. In some examples, IBC may be considered to be a special case of inter prediction, in which case functionality attributed to IBC unit 48 may be considered to be performed by MEU 42 and/or MCU 44. For some blocks, MEU 42 and/or MCU 44 may perform LIC as described above.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, MEU 42 may perform a motion search relative to the full pixel positions and fractional pixel positions and output a motion vector with fractional pixel precision.

MEU 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. MEU 42 sends the calculated motion vector to entropy encoding unit 56 and MCU 44.

Motion compensation, performed by MCU 44, may involve fetching or generating the predictive block based on the motion vector determined by motion estimation, possibly performing interpolations to sub-pixel precision. Upon receiving the motion vector for the PU of the current video block, MCU 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. MCU 44 may also generate syntax elements associated with the video blocks and the video slice for use by video decoder 30 in decoding the video blocks of the video slice.

In some examples, IBC unit 48 may generate two-dimensional vectors and fetch predictive blocks in a manner similar to that described above with respect to MEU 42 and MCU 44, but with the predictive blocks being in the same picture or frame as the current block. In other examples, IBC unit 48 may use MEU 42 and MCU 44, in whole or in part, to perform such functions for IBC prediction according to the techniques described herein. In either case, for IBC, a predictive block may be a block that is found to closely match the block to be coded, in terms of pixel difference, which may be determined by SAD. SSD, or other difference metrics, and identification of the block may include calculation of values for sub-integer pixel positions.

After prediction processing unit 41 generates the predictive block for the current video block, via intra prediction, inter prediction, or IBC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. MCU 44 may calculate a reference block by adding the residual block to a predictive block of one of the reference pictures within one of the reference picture lists. MCU 44 may also apply one or more interpolation filters to the reconstructed residual block to calculate sub-integer pixel values for use in motion estimation. Summer 62 adds the reconstructed residual block to the motion compensated prediction block produced by MCU 44 to produce a reconstructed block.

Filter unit 64 filters the reconstructed block (e.g. the output of summer 62) and stores the filtered reconstructed block in DPB 66 for uses as a reference block. The reference block may be used by MEU 42 and MCU 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

Video encoder 20 may, in various examples, be configured to encode video data using one or more of the video coding techniques described above. For instance, video encoder 20 may apply LIC to encode a block. In some instances of applying LIC to a block, video encoder 20 may use merge mode to encode the block. The existing LIC techniques present one or more potential issues, particularly in these scenarios. For instance, if video encoder 20 uses merge mode to encode a block to which LIC is/will be applied, then video encoder 20 may derive the motion information and LIC flag information from the spatial candidates already in or to be added to the merge candidate list.

Therefore, according to existing LIC algorithms, the temporal candidates may need to store the LIC flags of each reference in a reference buffer of video encoder 20, thereby increasing the cost of memory. The techniques of this disclosure enable video encoder 20 to derive the LIC flag of temporal candidates from the spatial neighbors and/or spatial candidates. As such, the techniques of this disclosure mitigate or potentially eliminate the need to store the LIC flag information in a reference buffer of video encoder 20. For instance, to apply LIC to a merge mode encoded block, video encoder 20 may store the LIC flag with the temporal candidate of the merge list to a reference buffer implemented in video data memory 33. As such, applying LIC to a merge mode encoded block causes significant computing resource consumption and introduces complexity, by way of memory cost and read-write operations.

Techniques of this disclosure address these potential issues with respect to applying LIC in conjunction with merge mode encoding. Video encoder 20 may implement any of the below-discussed techniques individually, or may implement two or more of the below-discussed techniques in combination. As used herein with respect to describing the techniques of this disclosure, "motion information" or a "set of motion information" may refer to data that includes LIC flag information. As used herein, the term "temporal candidate" includes both traditional TMVP candidates, as well as sub-block based TMVP candidates, such as ATMVP candidates.

According to various techniques of this disclosure, video encoder 20 may derive the LIC flag of temporal merge candidate(s) from spatial neighbors of the block currently being encoded. In some examples of the derivation techniques described here, video encoder 20 may derive the LIC flag for the temporal candidates from spatial candidates that have already been added to the candidate list. More specifically, according to these examples, video encoder 20 may derive the LIC flag of the temporal candidate by only checking those spatial candidates that use the same reference picture as the temporal candidate.

For instance, video encoder 20 may compare the POC value of the reference picture associated with the temporal candidate against the respective reference picture(s) of the spatial candidate(s) already in the candidate list. If video encoder 20 determines that the POC value of the reference picture associated with the temporal candidate matches the POC value of the reference picture associated with any one or more of the spatial candidates that is/are already added to the candidate list, then any such spatial candidates are considered "eligible" spatial candidates for this implementation of the disclosed techniques. Video encoder 20 may inspect the eligible spatial candidates to extract information from which to derive the value of the LIC flag for the temporal candidate.

For example, if video encoder 20 determines that the LIC flag of any of the eligible spatial candidates is set to a true value (e.g., a value of one (1)), then video encoder 20 may set the value of the LIC flag for the temporal candidate to the true value (in, this example, the value of one (1)). However, if video encoder 20 determines that none of the eligible spatial candidates has its LIC flag set to the true value, then video encoder 20 may set the LIC flag of the temporal candidate to a false value (e.g., to a value of zero (0)).

In other words, if video encoder 20 determines that each and every eligible spatial candidate has its LIC flag set to a false value (in this case, a value of zero (0)), then video encoder 20 may set the LIC flag of the temporal candidate to the false value (in this example, a value of zero (0)). Once again, according to this example implementation of the disclosed techniques, an "eligible" spatial candidate is defined as a spatial candidate that has already been added to the merge candidate list prior to the temporal candidate being added to the merge candidate list, and is associated with the same reference picture as the reference picture to which the temporal candidate is associated.

According to some example implementations of this disclosure, video encoder 20 may derive the LIC flag of the temporal candidate from information relating to spatial neighbors that use the same reference picture as the temporal candidate. That is, in these examples, video encoder 20 may use POC value-based comparison and matching to determine which spatial neighbors (if any) are associated with the same reference picture as the reference picture associated with the temporal candidate for a merge mode encoded block. In turn, upon identifying any spatial neighbors associated with the same reference picture as the reference picture associated with the temporal candidate, video encoder 20 may inspect the LIC flags of the identified spatial neighbors.

In these examples, if video encoder 20 determines that the LIC flag of any of the identified spatial neighbor is set to a true value (e.g., a value of one (1)), then video encoder 20 may set the value of the LIC flag for the temporal candidate to the true value (in, this example, the value of one (1)). However, if video encoder 20 determines that none of the identified spatial neighbors has its LIC flag set to the true value, then video encoder 20 may set the LIC flag of the temporal candidate to a false value (e.g., to a value of zero (0)). In other words, if video encoder 20 determines that each and every identified spatial neighbor has its LIC flag set to a false value (in this case, a value of zero (0)), then video encoder 20 may set the LIC flag of the temporal candidate to the false value (in this example, a value of zero (0)).

According to some example implementations of this disclosure, video encoder 20 may derive the LIC flag of the temporal candidate from information relating to all spatial neighbors that use the same reference picture as the temporal candidate, regardless of whether the spatial neighbors candidates have been added to the merge candidate list. That is, in these examples, video encoder 20 may use POC value-based comparison and matching to determine which spatial candidates (if any) derived from spatially neighboring blocks of the current block are associated with the same reference picture as the reference picture associated with the temporal candidate for a merge mode encoded block. In turn, upon identifying any spatial neighbor candidates associated with the same reference picture as the reference picture associated with the temporal candidate, video encoder 20 may inspect the LIC flags of the identified spatial neighboring candidates.

In these examples, if video encoder 20 determines that the LIC flag of any of the identified spatial neighbor candidates is set to a true value (e.g., a value of one (1)), then video encoder 20 may set the value of the LIC flag for the temporal candidate to the true value (in, this example, the value of one (1)). However, if video encoder 20 determines that none of the identified spatial neighbor candidates has its LIC flag set to the true value, then video encoder 20 may set the LIC flag of the temporal candidate to a false value (e.g., to a value of zero (0)). In other words, if video encoder 20 determines that each and every identified spatial neighbor candidate has its LIC flag set to a false value (in this case, a value of zero (0)), then video encoder 20 may set the LIC flag of the temporal candidate to the false value (in this example, a value of zero (0)).

According to some example implementations of this disclosure, video encoder 20 may derive the LIC flag of the temporal candidate from information relating to one spatial neighbor that uses the same reference picture as the temporal candidate. In these examples, video encoder 20 may use POC value-based comparison and matching to identify the first available spatial neighbor derived from spatially neighboring blocks of the current block that is associated with the same reference picture as the reference picture associated with the temporal candidate for a merge mode encoded block. In turn, upon identifying the first available spatial neighbor candidate associated with the same reference picture as the reference picture associated with the temporal candidate, video encoder 20 may inherit the LIC flag value of the identified first available spatial neighbor to encode the LIC flag of the temporal candidate. That is, in these examples, video encoder 20 may inherit (or copy) the LIC flag value of the first available spatial neighbor as the value of the LIC flag of the temporal candidate.

According to some example implementations of this disclosure, video encoder 20 may derive the LIC flag of the temporal candidate from information relating to one spatial candidate (from a neighboring block or otherwise) that is previously added to the merge candidate list, and uses the same reference picture as the temporal candidate. In these examples, video encoder 20 may use POC value-based comparison and matching to identify the first available spatial candidate (whether derived from neighboring blocks of the current block or blocks that are not immediately adjacent to the current block) that is already added to the merge candidate list, and is associated with the same reference picture as the reference picture associated with the temporal candidate for a merge mode encoded block.

In turn, upon identifying the first available spatial candidate already added to the merge candidate list and being associated with the same reference picture as the reference picture associated with the temporal candidate, video encoder 20 may inherit the LIC flag value of the identified first spatial candidate to encode the LIC flag of the temporal candidate. That is, in these examples, video encoder 20 may inherit (or copy) the LIC flag value of the first available spatial candidate that is already added to the merge candidate list as the value of the LIC flag of the temporal candidate.

According to some example implementations of this disclosure, video encoder 20 may derive the LIC flag of the temporal candidate from information relating to one spatial candidate (from a neighboring block or otherwise) that uses the same reference picture as the temporal candidate. That is, in these examples, video encoder 20 may expand the pool of possibilities for the first available spatial candidate to include spatial candidates that are already added to the merge candidate list, as well as any spatial candidates that have not yet been added to the merge candidate list (i.e. that will be added to the merge candidate list at positions after the temporal candidate).

In these examples, video encoder 20 may use POC value-based comparison and matching to identify the first available spatial candidate (whether derived from neighboring blocks of the current block or blocks that are not immediately adjacent to the current block) that is associated with the same reference picture as the reference picture associated with the temporal candidate for a merge mode encoded block. In turn, upon identifying the first available spatial candidate being associated with the same reference picture as the reference picture associated with the temporal candidate, video encoder 20 may inherit the LIC flag value of the identified first spatial candidate to encode the LIC flag of the temporal candidate. That is, in these examples, video encoder 20 may inherit (or copy) the LIC flag value of the first available spatial candidate (regardless of whether or not the first available spatial candidate is already added to the merge candidate list) as the value of the LIC flag of the temporal candidate.

According to some example implementations of this disclosure, video encoder 20 may determine that multiple spatial neighbors are associated with the same reference picture as the reference picture associated with the temporal candidate. According to these implementations, video encoder 20 may derive the LIC flag of the temporal candidate by determining which of the multiple spatial neighbors (referred to as the "pool" of spatial neighbors) having the same reference picture as the reference picture of the temporal candidate has the lowest MV difference from the temporal candidate. That is, video encoder 20 may determine the minimum. MV difference (from the temporal candidate) among the pool of spatial neighbors, to choose one of the identified spatial neighbors. In turn, according to these implementations, video encoder 20 may identify the spatial neighbor of the pool that has the minimum MV difference from the temporal candidate, and use the LIC flag value of the identified spatial neighbor to derive the LIC flag value for the temporal candidate.

For instance, video encoder 20 may inherit the LIC flag value of the identified spatial neighbor (having the minimum MV difference from the temporal candidate) to encode the LIC flag of the temporal candidate. That is, in these examples, video encoder 20 may inherit (or copy) the LIC flag value of the identified spatial neighbor (having the minimum MV difference from the temporal candidate) as the value of the LIC flag of the temporal candidate. According to these implementations, if video encoder 20 determines that none of the spatial neighbors is available, then video encoder 20 may set the LIC flag of the temporal candidate to a default value of false a zero (0) value). To calculate the MV difference between the temporal candidate and a spatial neighbor of the pool, video encoder 20 may use various formulas. Two examples of formulas that video encoder 20 may use to calculate an MV difference between the temporal candidate and a given spatial neighbor are illustrated in equations (4) and (5) below:

$$MV_{difference} = (Vx_{spatial} - Vx_{tepmoral})^2 + (Vy_{spatial} - Vy_{tepmoral})^2 \quad (4)$$

$$MV_{difference} = |Vx_{spatial} - Vx_{tepmoral}| + |Vy_{spatial} - Vy_{tepmoral}| \quad (5)$$

where $MV_{difference}$ is MV difference, $Vx_{spatial}$ is the motion vector of spatial neighbor in horizontal direction, $Vy_{spatial}$ is the motion vector of spatial neighbor in vertical direction, $Vx_{temporal}$ is the motion vector of temporal candidate in horizontal direction, $Vy_{temporal}$ is the motion vector of temporal candidate in vertical direction.

According to some example implementations of this disclosure, video encoder 20 may determine that one or more spatial neighbor candidates that have already been added to the merge candidate list are associated with the same reference picture as the reference picture associated with the temporal candidate. According to these implementations, if video encoder 20 determines that the merge candidate list already includes multiple spatial neighbor candidates with the same reference picture as the reference picture of the temporal candidate, video encoder 20 may derive the LIC flag of the temporal candidate by determining which of the multiple spatial neighbors already added to the merge candidate list (referred to as the "pool" of spatial neighbor candidates) having the same reference picture as the reference picture of the temporal candidate has the lowest MV difference from the temporal candidate.

That is, video encoder 20 may determine the minimum MV difference (from the temporal candidate) among the pool of spatial neighbor candidates already added to the merge candidate list, to choose one of the identified spatial neighbor candidates. In turn, according to these implementations, video encoder 20 may identify the spatial neighbor candidate of the pool that has the minimum MV difference from the temporal candidate, and use the LIC flag value of the identified spatial neighbor candidate to derive the LIC flag value for the temporal candidate. For instance, video encoder 20 may inherit the LIC flag value of the identified spatial neighbor candidate (having the minimum MV difference from the temporal candidate) already in the merge candidate list, to encode the LIC flag of the temporal candidate.

That is, in these examples, video encoder 20 may inherit (or copy) the LIC flag value of the identified spatial candidate (having the minimum MV difference from the temporal candidate) already added to the merge candidate list as the value of the LIC flag of the temporal candidate. According to these implementations, if video encoder 20 determines that no spatial neighbor candidates is available from the merge candidate list as constructed thus far, then video encoder 20 may set the LIC flag of the temporal candidate to a default value of false (e.g., a zero (0) value). To calculate the MV difference between the temporal candidate and a spatial neighbor candidate of the pool, video encoder 20 may use various formulas. Two examples of formulas that video encoder 20 may use to calculate an MV difference between the temporal candidate and a given spatial neighbor candidate are illustrated in equations (4) and (5) above.

According to some example implementations of this disclosure, video encoder 20 may determine that multiple spatial candidates (from a neighboring block or otherwise) are associated with the same reference picture as the reference picture associated with the temporal candidate. That is, in these implementations, video encoder 20 may use spatial candidates, whether the candidates are derived from neighboring blocks of the current block or from blocks that are not immediately adjacent to the current block. According to these implementations, video encoder 20 may derive the LIC flag of the temporal candidate by determining which of the multiple spatial candidates (referred to as the "pool" of spatial candidates) having the same reference picture as the reference picture of the temporal candidate has the lowest MV difference from the temporal candidate.

That is, video encoder 20 may determine the minimum MV difference (from the temporal candidate) among the pool of spatial candidates, to choose one of the identified spatial candidates. In turn, according to these implementations, video encoder 20 may identify the spatial candidate of the pool that has the minimum MV difference from the temporal candidate. Again, in these implementations, spatial candidates represent candidates derived from blocks in the general spatial neighborhood of the current block, whether the candidates are derived from neighboring (i.e., directly adjacently-positioned) blocks of the current block, or from blocks that are not immediately adjacent to the current block.

In turn, video encoder 20 may use the LIC flag value of the identified spatial candidate to derive the LIC flag value for the temporal candidate. For instance, video encoder 20 may inherit the LIC flag value of the identified spatial candidate (having the minimum MV difference from the temporal candidate) to encode the LIC flag of the temporal candidate. That is, in these examples, video encoder 20 may inherit (or copy) the LIC flag value of the identified spatial candidate (having the minimum MV difference from the temporal candidate) as the value of the LIC flag of the temporal candidate. According to these implementations, if video encoder 20 determines that none of the spatial candidates is available, then video encoder 20 may set the LIC flag of the temporal candidate to a default value of false (e.g., a zero (0) value). To calculate the MV difference between the temporal candidate and a spatial neighbor candidate of the pool, video encoder 20 may use the formula shown above in equation (4).

Video encoder 20 apply one or more of the spatial candidate-based derivation of the LIC flag value of the temporal candidate to motion vectors in reference list0 or reference or both. For instance, if the LIC flag derived from the spatial candidates having the same reference picture in List 0 as the temporal candidate is denoted as "LIC0" and the LIC flag derived from the spatial candidates having the same reference picture in List 1 as the temporal candidate is denoted as "LIC1." In these examples, video encoder 20 may set the LIC flag of the temporal candidate to be one of (LIC0 AND LIC1) or (LIC0 OR LIC1).

In other implementations of the techniques of this disclosure, video encoder 20 may set the LIC flag of the temporal candidate separately for reference list0 and reference list1 In one example of these implementations, video encoder 20 may set LIC0 to a true value (e.g., a value of one (1)) if illumination compensation is applied for reference list1, and may set LIC1 to the true value (e.g., the value of one (1)) if illumination compensation is applied for reference list1.

According to some techniques of this disclosure, video encoder 20 may set the LIC flag value for the temporal candidate using methodologies other than deriving the temporal candidate's LIC flag value from the spatial candidates in the merge list. Techniques of this disclosure that are not based on spatial candidate-based derivation are referred to herein as "non-spatial candidate derivation" techniques. In one example of the non-spatial candidate derivation techniques of this disclosure, video encoder 20 may set the value of the LIC flag of the temporal candidate to a predetermined fixed value. As examples, video encoder 20 may use a default value of one (1) or a default value of zero (0) as the LIC flag value of the temporal candidate in a merge list.

In another example of the non-spatial candidate derivation techniques of this disclosure, video encoder 20 may signal the temporal candidate's LIC flag value as a value that applies at one of the sequence level, the picture level, the slice level, or the block level. For instance, video encoder 20 may signal the value to be assigned as the temporal candidate's LIC flag value in a sequence parameter set (SPS), picture parameter set (PPS), slice header (SH), CTU, or CU. In another example of the non-spatial candidate derivation techniques of this disclosure, video encoder 20 may infer the IC flag value of a neighboring merge mode encoded block as always being set to one (1) or zero (0) in order to calculate the CABAC context in the syntax parsing process.

Figure 16:
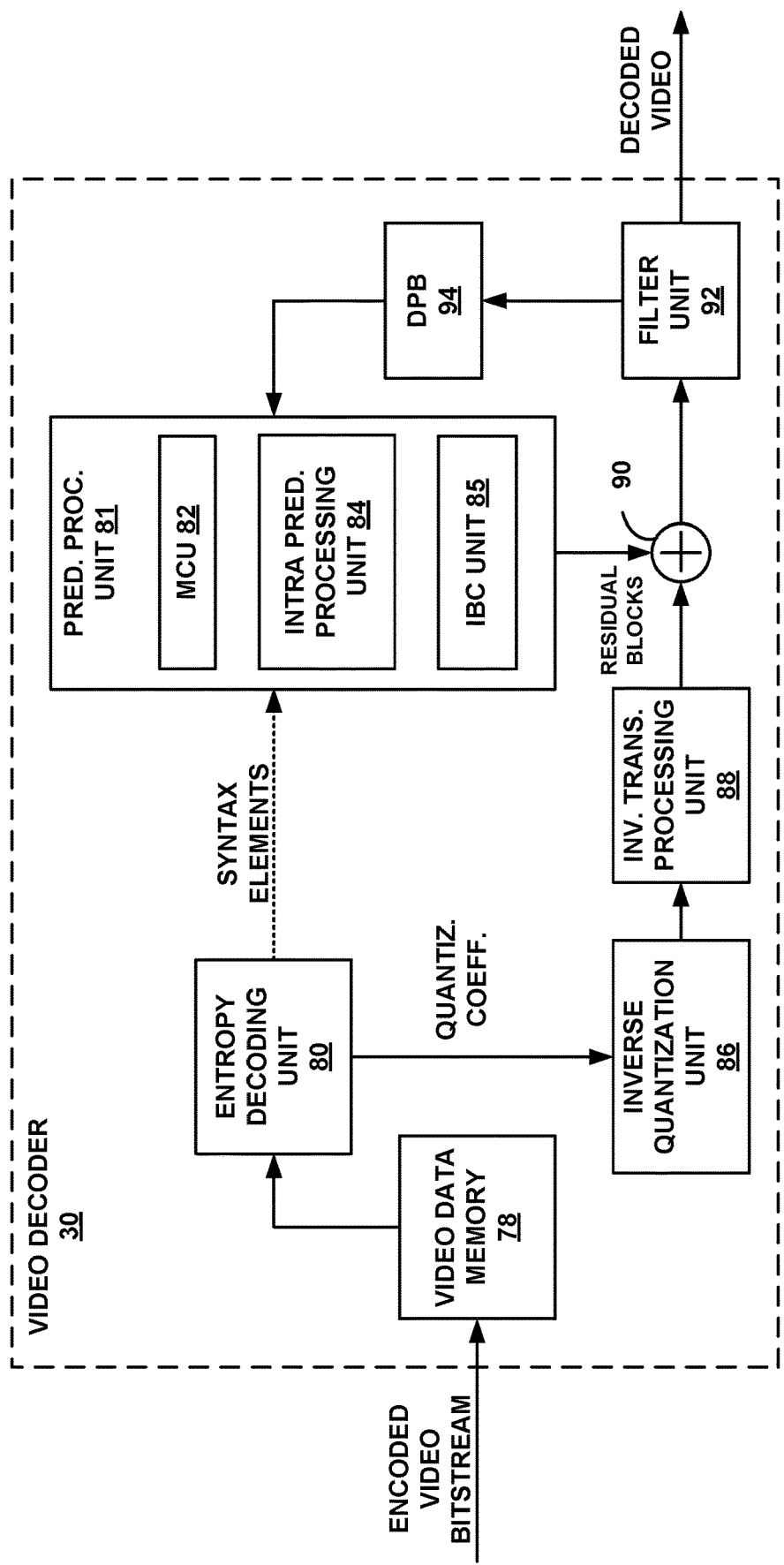
FIG. 16 is a block diagram illustrating an example video decoder 30 that may implement the techniques described in this disclosure.

FIG. 16 is a block diagram illustrating an example video decoder 30 that may implement the techniques described in this disclosure. In the example of FIG. 16, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes MCU 82, intra prediction processing unit 84, and IBC unit 85. Video decoder 30 may, in some examples, perform a decoding pass generally reciprocal to the encoding pass described with respect to video encoder 20 from FIG. 15.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. For some CUs, intra prediction processing unit 84 may decode blocks as described above. When the video frame is coded as an inter-coded, MCU 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

MCU 82 and/or IBC unit 85 determine prediction information for a video block of the current video slice by parsing the motion vectors and other syntax elements and use the prediction information to produce the predictive blocks for the current video block being decoded. For example, MCU 82 uses some of the received syntax elements to determine a prediction mode (e.g., intra- or inter-prediction or IBC) used to code the video blocks of the video slice, construction information for one or more of the reference picture lists for the slice, motion vectors for each inter-encoded video block of the slice, inter-prediction status for each inter-coded video block of the slice, and other information to decode the video blocks in the current video slice. In some examples, IBC may be considered to be a special case of inter prediction, in which case functionality attributed to IBC unit 85 may be considered to be performed by MCU 82. For some blocks, MCU 82 may perform LIC as described above.

MCU 82 and/or IBC unit 85 may also perform interpolation based on interpolation filters. MCU 82 and/or IBC unit 85 may use interpolation filters as used by video encoder 20 during encoding of the video blocks to calculate interpolated values for sub-integer pixels of reference blocks. In this case, MCU 82 and/or IBC unit 85 may determine the interpolation filters used by video encoder 20 from the received syntax elements and use the interpolation filters to produce predictive blocks. For some blocks, MCU 82 may also perform LIC as described above.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by MCU 82. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Video decoder 30 may, in various examples, be configured to decode video data using one or more of the video coding techniques described above. For instance, video decoder 30 may implement apply LIC to encode a block. In some instances of applying LIC to a block, video decoder 30 may use merge mode to decode the block. The existing LIC techniques present one or more potential issues, particularly in these scenarios. For instance, if video decoder 30 uses merge mode to decode a block to which LIC is/will be applied, then video decoder 30 may derive the motion information and LIC flag information from the candidates already in or to be added to the merge candidate list.

Therefore, video decoder 30 may need to store the LIC flags of each reference in a reference buffer. The techniques of this disclosure enable video decoder 30 to derive the LIC flag of temporal candidates from the spatial neighbors and/or spatial candidates. As such, the techniques of this disclosure mitigate or potentially eliminate the need to store the LIC flag information in a reference buffer of video decoder 30. For instance, to apply LIC in decoding a merge mode encoded block, video decoder 30 may store the LIC flag with the temporal candidate of the merge list to a reference buffer implemented in video data memory 78. As such, applying LIC in decoding a merge mode encoded block causes significant computing resource consumption and introduces complexity, by way of memory cost and read-write operations.

Techniques of this disclosure address these potential issues with respect to applying LIC in conjunction with merge mode encoding. Video decoder 30 may implement any of the below-discussed techniques individually, or may implement two or more of the below-discussed techniques in combination. As used herein with respect to describing the techniques of this disclosure, "motion information" or a "set of motion information" may refer to data that includes LIC flag information. As used herein, the term "temporal candidate" includes both traditional TMVP candidates, as well as sub-block based TMVP candidates, such as ATMVP candidates.

According to various techniques of this disclosure, video decoder 30 may derive the LIC flag of temporal merge candidate(s) from spatial neighbors of the block currently being encoded. In some examples of the derivation techniques described here, video decoder 30 may derive the LIC flag for the temporal candidates from spatial candidates that have already been added to the candidate list. More specifically, according to these examples, video decoder 30 may derive the LIC flag of the temporal candidate by only checking those spatial candidates that use the same reference picture as the temporal candidate.

For instance, video decoder 30 may compare the POC value of the reference picture associated with the temporal candidate against the respective reference picture(s) of the spatial candidate(s) already in the candidate list. If video decoder 30 determines that the POC value of the reference picture associated with the temporal candidate matches the POC value of the reference picture associated with any one or more of the spatial candidates that is/are already added to the candidate list, then any such spatial candidates are considered "eligible" spatial candidates for this implementation of the disclosed techniques. Video decoder 30 may inspect the eligible spatial candidates to extract information from which to derive the value of the LIC flag for the temporal candidate.

For example, if video decoder 30 determines that the LIC flag of any of the eligible spatial candidates is set to a true value (e.g., a value of one (1)), then video decoder 30 may set the value of the LIC flag for the temporal candidate to the true value (in, this example, the value of one (1)). However, if video decoder 30 determines that none of the eligible spatial candidates has its LIC flag set to the true value, then video decoder 30 may set the LIC flag of the temporal candidate to a false value (e.g., to a value of zero (0)).

In other words, if video decoder 30 determines that each and every eligible spatial candidate has its LIC flag set to a false value (in this case, a value of zero (0)), then video decoder 30 may set the LIC flag of the temporal candidate to the false value (in this example, a value of zero (0)). Once again, according to this example implementation of the disclosed techniques, an "eligible" spatial candidate is defined as a spatial candidate that has already been added to the merge candidate list prior to the temporal candidate being added to the merge candidate list, and is associated with the same reference picture as the reference picture to which the temporal candidate is associated.

According to some example implementations of this disclosure, video decoder 30 may derive the LIC flag of the temporal candidate from information relating to all spatial neighbors that use the same reference picture as the temporal candidate, regardless of whether the spatial neighbors have been added to the merge candidate list. That is, in these examples, video decoder 30 may use POC value-based comparison and matching to determine which spatial neighbors (if any) are associated with the same reference picture as the reference picture associated with the temporal candidate for a merge mode encoded block. In turn, upon identifying any spatial neighbors associated with the same reference picture as the reference picture associated with the temporal candidate, video decoder 30 may inspect the LIC flags of the identified spatial neighbors.

In these examples, if video decoder 30 determines that the LIC flag of any of the identified spatial neighbors is set to a true value (e.g., a value of one (1)), then video decoder 30 may set the value of the LIC flag for the temporal candidate to the true value (in, this example, the value of one (1)), However, if video decoder 30 determines that none of the identified spatial neighbors has its LIC flag set to the true value, then video decoder 30 may set the LIC flag of the temporal candidate to a false value (e.g., to a value of zero (0)). In other words, if video decoder 30 determines that each and every identified spatial neighbor has its LIC flag set to a false value (in this case, a value of zero (0)), then video decoder 30 may set the LIC flag of the temporal candidate to the false value (in this example, a value of zero (0)).

According to some example implementations of this disclosure, video decoder 30 may derive the LIC flag of the temporal candidate from information relating to all spatial neighbors that use the same reference picture as the temporal candidate, regardless of whether the spatial neighbor candidates have been added to the merge candidate list. That is, in these examples, video decoder 30 may use POC value-based comparison and matching to determine which spatial candidates (if any) derived from spatially neighboring blocks of the current block are associated with the same reference picture as the reference picture associated with the temporal candidate for a merge mode encoded block. In turn, upon identifying any spatial neighbor candidates associated with the same reference picture as the reference picture associated with the temporal candidate, video decoder 30 may inspect the LIC flags of the identified spatial neighboring candidates.

In these examples, if video decoder 30 determines that the LIC flag of any of the identified spatial neighbor candidates is set to a true value (e.g., a value of one (1)), then video decoder 30 may set the value of the LIC flag for the temporal candidate to the true value (in, this example, the value of one (1)). However, if video decoder 30 determines that none of the identified spatial neighbor candidates has its LIC flag set to the true value, then video decoder 30 may set the LIC flag of the temporal candidate to a false value (e.g., to a value of zero (0)). In other words, if video decoder 30 determines that each and every identified spatial neighbor candidate has its LIC flag set to a false value (in this case, a value of zero (0)), then video decoder 30 may set the LIC flag of the temporal candidate to the false value (in this example, a value of zero (0)).

According to some example implementations of this disclosure, video decoder 30 may derive the LIC flag of the temporal candidate from information relating to one spatial neighbor that uses the same reference picture as the temporal candidate. In these examples, video decoder 30 may use POC value-based comparison and matching to identify the first available spatial neighbor derived from spatially neighboring blocks of the current block that is associated with the same reference picture as the reference picture associated with the temporal candidate for a merge mode encoded block. In turn, upon identifying the first available spatial neighbor associated with the same reference picture as the reference picture associated with the temporal candidate, video decoder 30 may inherit the LIC flag value of the identified first available spatial neighbor to encode the LIC flag of the temporal candidate. That is, in these examples, video decoder 30 may inherit (or copy) the LIC flag value of the first available spatial neighbor as the value of the LIC flag of the temporal candidate.

According to some example implementations of this disclosure, video decoder 30 may derive the LIC flag of the temporal candidate from information relating to one spatial candidate (from a neighboring block or otherwise) that is previously added to the merge candidate list, and uses the same reference picture as the temporal candidate. In these examples, video decoder 30 may use POC value-based comparison and matching to identify the first available spatial candidate (whether derived from neighboring blocks of the current block or blocks that are not immediately adjacent to the current block) that is already added to the merge candidate list, and is associated with the same reference picture as the reference picture associated with the temporal candidate for a merge mode encoded block.

In turn, upon identifying the first available spatial candidate already added to the merge candidate list and being associated with the same reference picture as the reference picture associated with the temporal candidate, video decoder 30 may inherit the LIC flag value of the identified first spatial candidate to encode the LIC flag of the temporal candidate. That is, in these examples, video decoder 30 may inherit (or copy) the LIC flag value of the first available spatial candidate that is already added to the merge candidate list as the value of the LIC flag of the temporal candidate.

According to some example implementations of this disclosure, video decoder 30 may derive the LIC flag of the temporal candidate from information relating to one spatial candidate (from a neighboring block or otherwise) that uses the same reference picture as the temporal candidate. That is, in these examples, video decoder 30 may expand the pool of possibilities for the first available spatial candidate to include spatial candidates that are already added to the merge candidate list, as well as any spatial candidates that have not yet been added to the merge candidate list that will be added to the merge candidate list at positions after the temporal candidate).

In these examples, video decoder 30 may use POC value-based comparison and matching to identify the first available spatial candidate (whether derived from neighboring blocks of the current block or blocks that are not immediately adjacent to the current block) that is associated with the same reference picture as the reference picture associated with the temporal candidate for a merge mode encoded block. In turn, upon identifying the first available spatial candidate being associated with the same reference picture as the reference picture associated with the temporal candidate, video decoder 30 may inherit the LIC flag value of the identified first spatial candidate to encode the LIC flag of the temporal candidate. That is, in these examples, video decoder 30 may inherit (or copy) the LIC flag value of the first available spatial candidate (regardless of whether or not the first available spatial candidate is already added to the merge candidate list) as the value of the LIC flag of the temporal candidate.

According to some example implementations of this disclosure, video decoder 30 may determine that multiple spatial neighbors are associated with the same reference picture as the reference picture associated with the temporal candidate. According to these implementations, video decoder 30 may derive the LIC flag of the temporal candidate by determining which of the multiple spatial neighbors (referred to as the "pool" of spatial neighbors) having the same reference picture as the reference picture of the temporal candidate has the lowest MV difference from the temporal candidate. That is, video decoder 30 may determine the minimum MV difference (from the temporal candidate) among the pool of spatial neighbors, to choose one of the identified spatial neighbors. In turn, according to these implementations, video decoder 30 may identify the spatial neighbor of the pool that has the minimum MV difference from the temporal candidate, and use the LIC flag value of the identified spatial neighbor to derive the LIC flag value for the temporal candidate.

For instance, video decoder 30 may inherit the LIC flag value of the identified spatial neighbor (having the minimum MV difference from the temporal candidate) to encode the LIC flag of the temporal candidate. That is, in these examples, video decoder 30 may inherit (or copy) the LIC flag value of the identified spatial neighbor (having the minimum MV difference from the temporal candidate) as the value of the LIC flag of the temporal candidate. According to these implementations, if video decoder 30 determines that none of the spatial neighbors is available, then video decoder 30 may set the LIC flag of the temporal candidate to a default value of false (e.g., a zero (0) value). To calculate the MV difference between the temporal candidate and a spatial neighbor of the pool, video decoder 30 may use various formulas. Two examples of formulas that video decoder 30 may use to calculate an MV difference between the temporal candidate and a given spatial neighbor are illustrated in equations (4) and (5) above.

According to some example implementations of this disclosure, video decoder 30 may determine that one or more spatial neighbor candidates that have already been added to the merge candidate list are associated with the same reference picture as the reference picture associated with the temporal candidate. According to these implementations, if video decoder 30 determines that the merge candidate list already includes multiple spatial neighbor candidates with the same reference picture as the reference picture of the temporal candidate, video decoder 30 may derive the LIC flag of the temporal candidate by determining which of the multiple spatial neighbors already added to the merge candidate list (referred to as the "pool" of spatial neighbor candidates) having the same reference picture as the reference picture of the temporal candidate has the lowest MV difference from the temporal candidate.

That is, video decoder 30 may determine the minimum MV difference (from the temporal candidate) among the pool of spatial neighbor candidates already added to the merge candidate list, to choose one of the identified spatial neighbor candidates. In turn, according to these implementations, video decoder 30 may identify the spatial neighbor candidate of the pool that has the minimum MV difference from the temporal candidate, and use the LIC flag value of the identified spatial neighbor candidate to derive the LIC flag value for the temporal candidate. For instance, video decoder 30 may inherit the LIC flag value of the identified spatial neighbor candidate (having the minimum MV difference from the temporal candidate) already in the merge candidate list, to encode the LIC flag of the temporal candidate.

That is, in these examples, video decoder 30 may inherit (or copy) the LIC flag value of the identified spatial candidate (having the minimum MV difference from the temporal candidate) already added to the merge candidate list as the value of the LIC flag of the temporal candidate. According to these implementations, if video decoder 30 determines that no spatial neighbor candidates is available from the merge candidate list as constructed thus far, then video decoder 30 may set the LIC flag of the temporal candidate to a default value of false (e.g., a zero (0) value). To calculate the MV difference between the temporal candidate and a spatial neighbor candidate of the pool, video decoder 30 may use various formulas. Two examples of formulas that video decoder 30 may use to calculate an MV difference between the temporal candidate and a given spatial neighbor candidate are illustrated in equations (4) and (5) above.

According to some example implementations of this disclosure, video decoder 30 may determine that multiple spatial candidates (from a neighboring block or otherwise) are associated with the same reference picture as the reference picture associated with the temporal candidate. That is, in these implementations, video decoder 30 may use spatial candidates, whether the candidates are derived from neighboring blocks of the current block or from blocks that are not immediately adjacent to the current block. According to these implementations, video decoder 30 may derive the LIC flag of the temporal candidate by determining which of the multiple spatial candidates (referred to as the "pool" of spatial candidates) having the same reference picture as the reference picture of the temporal candidate has the lowest MV difference from the temporal candidate.

That is, video decoder 30 may determine the minimum MV difference (from the temporal candidate) among the pool of spatial candidates, to choose one of the identified spatial candidates. In turn, according to these implementations, video decoder 30 may identify the spatial candidate of the pool that has the minimum MV difference from the temporal candidate. Again, in these implementations, spatial candidates represent candidates derived from blocks in the general spatial neighborhood of the current block, whether the candidates are derived from neighboring (i.e., directly adjacently-positioned) blocks of the current block, or from blocks that are not immediately adjacent to the current block.

In turn, video decoder 30 may use the LIC flag value of the identified spatial candidate to derive the LIC flag value for the temporal candidate. For instance, video decoder 30 may inherit the LIC flag value of the identified spatial candidate (having the minimum MV difference from the temporal candidate) to encode the LIC flag of the temporal candidate. That is, in these examples, video decoder 30 may inherit (or copy) the LIC flag value of the identified spatial candidate (having the minimum MV difference from the temporal candidate) as the value of the LIC flag of the temporal candidate. According to these implementations, if video decoder 30 determines that none of the spatial candidates is available, then video decoder 30 may set the LIC flag of the temporal candidate to a default value of false (e.g., a zero (0) value). To calculate the MV difference between the temporal candidate and a spatial neighbor candidate of the pool, video decoder 30 may use the formula shown above in equation (4).

Video decoder 30 apply one or more of the spatial candidate-based derivation of the LIC flag value of the temporal candidate to motion vectors in reference list0 or reference list1, or both. For instance, if the LIC flag derived from the spatial candidates having the same reference picture in List 0 as the temporal candidate is denoted as "LIC0" and the LIC flag derived from the spatial candidates having the same reference picture in List 1 as the temporal candidate is denoted as "LIC1." In these examples, video decoder 30 may set the LIC flag of the temporal candidate to be one of (LIC0 AND LIC1) or (LIC0 OR LIC1).

In other implementations of the techniques of this disclosure, video decoder 30 may set the LIC flag of the temporal candidate separately for reference list0 and reference list1. In one example of these implementations, video decoder 30 may set LIC0 to a true value (e.g., a value of one (1)) if illumination compensation is applied for reference list0, and may set LIC1 to the true value (e.g., the value of one (1)) if illumination compensation is applied for reference list1.

According to some techniques of this disclosure, video decoder 30 may set the LIC flag value for the temporal candidate using data that is explicitly signaled by video encoder 20 in the encoded video bitstream. Techniques of this disclosure that are based on LIC flag value information explicitly signaled in the encoded video bitstream are referred to herein as "non-spatial candidate derivation" techniques. In one example of the non-spatial candidate derivation techniques of this disclosure, video decoder 30 may set the value of the LIC flag of the temporal candidate to a predetermined fixed value signaled by video encoder 20, such as a default value of one (1) or a default value of zero (0).

Figure 17:
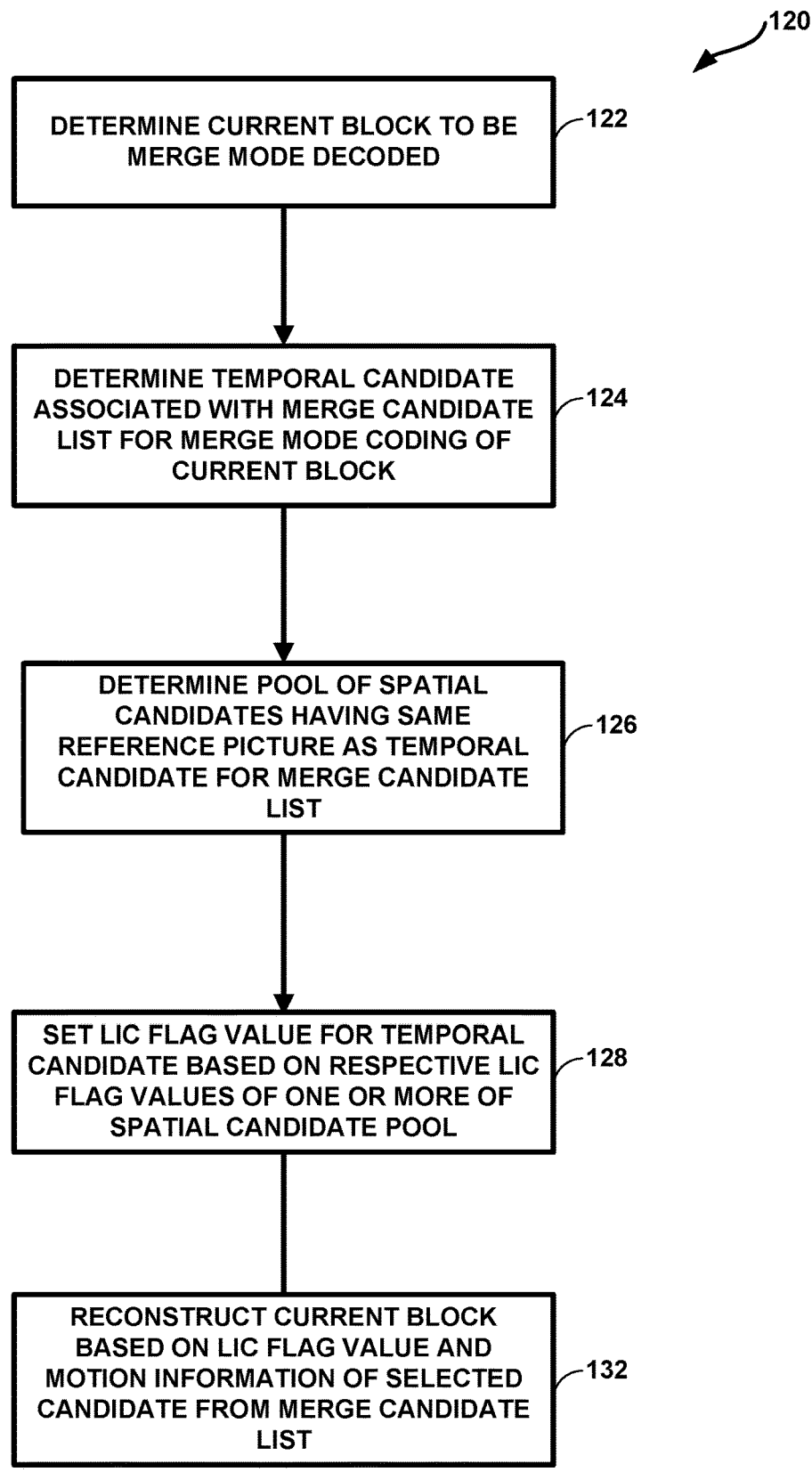
FIG. 17 is a flowchart illustrating an example process by which a video decoding device may perform various techniques of this disclosure.

In another example of the non-spatial candidate derivation techniques of this disclosure, video decoder 30 may receive, in the encoded video bitstream, the temporal candidate's LIC flag value as a value that applies at one of the sequence level, the picture level, the slice level, or the block level. For instance, video decoder 30 may receive the value to be assigned as the temporal candidate's LIC flag value in a sequence parameter set (SPS), picture parameter set (PPS), slice header (SH), CTU, or CU of the encoded video bitstream. In another example of the non-spatial candidate derivation techniques of this disclosure, video decoder 30 may receive the IC flag value as an inferred value of a neighboring merge mode encoded block that is always set to one (1) or zero (0) in order to calculate the CABAC context in the syntax parsing process.

FIG. 17 is a flowchart illustrating an example process 120 by which a video decoding device may perform various techniques of this disclosure. In accordance with aspects of this disclosure, process 120 may be performed by a variety of devices, including a video decoding device or a video encoding device configured to decode video data (e.g., via a decoding loop or reconstruction loop), etc. As an example, process 120 is described herein as being performed by processing circuitry of video decoder 30, with respect to video data stored to video data memory 78 of video decoder 30.

Process 120 may begin when the processing circuitry of video decoder 30 determines that a current block of video data stored to video data memory 78 is to be decoded according to merge mode (122). For instance, a communication unit of video decoder 30 may receive, in an encoded video bitstream, a merge flag with respect to the current block, and the processing circuitry of video decoder 30 may decode the merge mode flag to determine that merge flag is set to a "true" value with respect to the current block. In turn, the processing circuitry of video decoder 30 may determine a temporal candidate associated with a merge candidate list for the current block in accordance with the merge mode (124). The temporal candidate may be either a traditional TMVP candidate, or a sub-block based TMVP candidate (e.g., as provided for by ATMVP).

The processing circuitry of video decoder 30 may determine a pool of spatial candidates associated with the merge candidate list, such that each spatial candidate of the pool has the same reference picture as the reference picture of the temporal candidate (126). In turn, the processing circuitry of video decoder 30 may set an LIC flag value for the temporal candidate based on respective LIC flag values of one or more of the spatial candidates included in the pool of spatial candidates (128). The processing circuitry of video decoder 30 may reconstruct the current block based on the LIC flag value and the motion information of a selected candidate from the merge candidate list (132). For instance, if the LIC flag value of the selected candidate is set to "true," then the processing circuitry may apply or perform LIC in reconstructing the current block. Conversely, if the LIC flag value of the selected candidate is set to "false," then the processing circuitry may reconstruct the current block without performing LIC.

In some examples, to set the LIC flag value for the temporal candidate based on the respective LIC values of the one or more spatial candidates in the pool, the processing circuitry of video decoder 30 may set the LIC flag value for the temporal candidate using the respective LIC flag values of the one or more spatial candidates of the pool based on all of the spatial candidates of the pool having been added to the merge candidate list prior to the temporal candidate being added to the merge candidate list. In some examples, to set the LIC flag value for the temporal candidate based on the respective LIC values of the one or more spatial candidates in the pool, the processing circuitry of video decoder 30 may set the LIC flag value for the temporal candidate using the respective LIC flag values of the one or more spatial candidates of the pool based on all of the spatial candidates of the pool being derived from spatial neighboring blocks of the current block in a current picture of the video data.

In some examples, the pool of spatial candidates includes at least one spatial candidate derived from a block that is not positioned adjacently to the current block in a current picture of the video data stored to video data memory 78. In some examples, the spatial candidate derived from the block that is not positioned adjacent to the current block is a first spatial candidate of the pool, and wherein the pool of spatial candidates further includes a second spatial candidate derived from a neighboring block that is positioned adjacently to the current block in the current picture of the video data stored to video data memory 78.

In some examples, to set the LIC flag value for the temporal candidate based on the respective LIC values of the one or more spatial candidates in the pool, the processing circuitry of video decoder 30 may set the LIC flag value to a true value based on at least one of the respective LIC flag values of the one or more spatial candidates of the pool being set to the true value. In some examples, to set the LIC flag value for the temporal candidate based on the respective LIC values of the one or more spatial candidates in the pool, the processing circuitry of video decoder 30 may set the LIC flag value to a false value based on all of the respective LIC flag values of the one or more spatial candidates of the pool being set to the false value.

In some examples, to set the LIC flag value for the temporal candidate based on the respective LIC values of the one or more spatial candidates in the pool, the processing circuitry of video decoder 30 may inherit, as the LIC flag value for the temporal candidate, the respective LIC flag value of a first available spatial candidate of the pool. In some examples, to set the LIC flag value for the temporal candidate based on the respective LIC values of the one or more spatial candidates in the pool, the processing circuitry of video decoder 30 may determine respective motion vector (MV) distances between the temporal candidate and each respective spatial candidate of the pool, and may determine a minimum MV distance of the respective MV distances. In these examples, the processing circuitry of video decoder 30 may select a first spatial candidate from the pool based on the first spatial candidate having the minimum MV distance, and may inherit, as the LIC flag value for the temporal candidate, the respective LIC flag value of the first spatial candidate that has the minimum MV distance.

Figure 18:
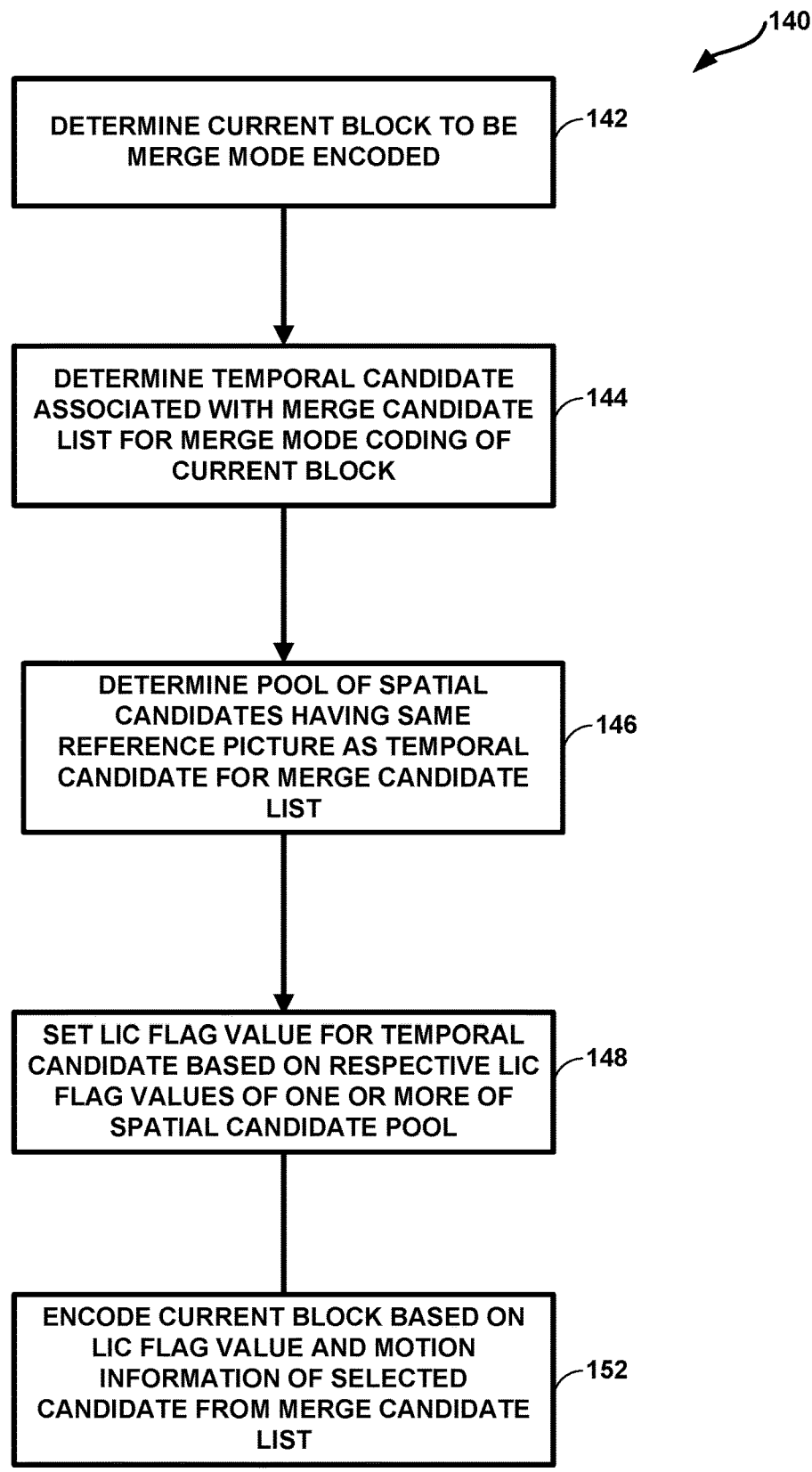
FIG. 18 is a flowchart illustrating an example process by which a video encoding device may perform various techniques of this disclosure.

FIG. 18 is a flowchart illustrating an example process 140 by which a video encoding device may perform various techniques of this disclosure. In accordance with aspects of this disclosure, process 140 may be performed by a variety of devices. As an example, process 140 is described herein as being performed by processing circuitry of video encoder 20, with respect to video data stored to video data memory 33 of video encoder 20.

Process 140 may begin when the processing circuitry of video encoder 20 determines that a current block of video data stored to video data memory 33 is to be encoded according to merge mode (142). In turn, the processing circuitry of video encoder 20 may determine a temporal candidate associated with a merge candidate list for the current block in accordance with the merge mode (144). The temporal candidate may be either a traditional TMVP candidate, or a sub-block based TMVP candidate (e.g., as provided for by ATMVP). The processing circuitry of video encoder 20 may determine a pool of spatial candidates associated with the merge candidate list, such that each spatial candidate of the pool has the same reference picture as the reference picture of the temporal candidate (146).

In turn, the processing circuitry of video encoder 20 may set an LIC flag value for the temporal candidate based on respective LIC flag values of one or more of the spatial candidates included in the pool of spatial candidates (148). The processing circuitry of video encoder 20 may encode the current block based on the LIC flag value and the motion information of a selected candidate from the merge candidate list (152). For instance, if the LIC flag value of the selected candidate is set to "true," then the processing circuitry may apply or perform LIC with respect to encode the current block. Conversely, if the LIC flag value of the selected candidate is set to "false," then the processing circuitry may encode the current block without performing LIC to.

In some examples, to set the LIC flag value for the temporal candidate based on the respective LIC values of the one or more spatial candidates in the pool, the processing circuitry of video encoder 20 may set the LIC flag value for the temporal candidate using the respective LIC flag values of the one or more spatial candidates of the pool based on all of the spatial candidates of the pool having been added to the merge candidate list prior to the temporal candidate being added to the merge candidate list. In some examples, to set the LIC flag value for the temporal candidate based on the respective LIC values of the one or more spatial candidates in the pool, the processing circuitry of video encoder 20 may set the LIC flag value for the temporal candidate using the respective LIC flag values of the one or more spatial candidates of the pool based on all of the spatial candidates of the pool being derived from spatial neighboring blocks of the current block in a current picture of the video data.

In some examples, the pool of spatial candidates includes at least one spatial candidate derived from a block that is not positioned adjacently to the current block in a current picture of the video data stored to video data memory 33. In some such examples, the spatial candidate derived from the block that is not positioned adjacent to the current block is a first spatial candidate of the pool, and wherein the pool of spatial candidates further includes a second spatial candidate derived from a neighboring block that is positioned adjacently to the current block in the current picture of the video data stored to video data memory 33.

In some examples, to set the LIC flag value for the temporal candidate based on the respective LIC values of the one or more spatial candidates in the pool, the processing circuitry of video encoder 20 may set the LIC flag value to a true value based on at least one of the respective LIC flag values of the one or more spatial candidates of the pool being set to the true value. In some examples, to set the LIC flag value for the temporal candidate based on the respective LIC values of the one or more spatial candidates in the pool, the processing circuitry of video encoder 20 may set the LIC flag value to a false value based on all of the respective LIC flag values of the one or more spatial candidates of the pool being set to the false value.

In some examples, to set the LIC flag value for the temporal candidate based on the respective LIC values of the one or more spatial candidates in the pool, the processing circuitry of video encoder 20 may inherit, as the LIC flag value for the temporal candidate, the respective LIC flag value of a first available spatial candidate of the pool. In some examples, to set the LIC flag value for the temporal candidate based on the respective LIC values of the one or more spatial candidates in the pool, the processing circuitry of video encoder 20 may determine respective motion vector (MV) distances between the temporal candidate and each respective spatial candidate of the pool, and may determine a minimum MV distance of the respective MV distances. In these examples, the processing circuitry of video encoder 20 may select a first spatial candidate from the pool based on the first spatial candidate having the minimum MV distance, and may inherit, as the LIC flag value for the temporal candidate, the respective LIC flag value of the first spatial candidate that has the minimum MV distance. In some examples, a communication unit of video encoder 20 may signal, in an encoded video bitstream, the merge index that identifies the position of the selected merge candidate in the merge candidate list.

When the video coder is a video encoder, the techniques may further include storing the video data in a memory of a wireless communication device, processing the video data on one or more processors of the wireless communication device, and transmitting the video data from a transmitter of the wireless communication device. The wireless communication device may, for example, include a telephone handset, and the telephone handset may transmit the video data at the transmitter of the wireless communication device by modulating, according to a wireless communication standard, a signal comprising the video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, including fixed function and/or programmable processing circuitry, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining that a current block of the video data is to be coded according to a merge mode;
    determining a temporal candidate associated with a merge candidate list for the current block in accordance with the merge mode;
    determining a pool of spatial candidates associated with the merge candidate list, based on each spatial candidate of the pool having a same reference picture as the temporal candidate; and
    setting a local illumination compensation (LIC) flag value for the temporal candidate based on respective LIC flag values of one or more spatial candidates of the pool.

2. The method of claim 1, wherein setting the LIC flag value for the temporal candidate based on the respective LIC flag values of the one or more spatial candidates of the pool comprises setting the LIC flag value for the temporal candidate using the respective LIC flag values of the one or more spatial candidates of the pool based on all of the spatial candidates of the pool having been added to the merge candidate list prior to the temporal candidate being added to the merge candidate list.

3. The method of claim 1, wherein setting the LIC flag value for the temporal candidate based on the respective LIC flag values of the one or more spatial candidates of the pool comprises setting the LIC flag value for the temporal candidate using the respective LIC flag values of the one or more spatial candidates of the pool based on all of the spatial candidates of the pool being derived from spatial neighboring blocks of the current block in a current picture of the video data.

4. The method of claim 1, wherein the pool of spatial candidates includes at least one spatial candidate derived from a block that is not positioned adjacently to the current block in a current picture of the video data.

5. The method of claim 4, wherein the spatial candidate derived from the block that is not positioned adjacently to the current block is a first spatial candidate of the pool, and wherein the pool of spatial candidates further includes a second spatial candidate derived from a neighboring block that is positioned adjacently to the current block in the current picture of the video data.

6. The method of claim 1, wherein setting the LIC flag value for the temporal candidate based on the respective LIC flag values of the one or more spatial candidates of the pool comprises setting the LIC flag value to a true value based on at least one of the respective LIC flag values of the one or more spatial candidates of the pool being set to the true value.

7. The method of claim 1, wherein setting the LIC flag value for the temporal candidate based on the respective LIC flag values of the one or more spatial candidates of the pool comprises setting the LIC flag value to a false value based all of the respective LIC flag values of the one or more spatial candidates of the pool being set to the false value.

8. The method of claim 1, wherein setting the LIC flag value for the temporal candidate based on the respective LIC flag values of the one or more spatial candidates of the pool comprises inheriting, as the LIC flag value for the temporal candidate, the respective LIC flag value of a first available spatial candidate of the pool.

9. The method of claim 1, wherein setting the LIC flag value for the temporal candidate based on the respective LIC flag values of the one or more spatial candidates of the pool comprises:
    determining respective motion vector (MV) distances between the temporal candidate and each respective spatial candidate of the pool;
    determining a minimum MV distance of the respective MV distances;
    selecting a first spatial candidate from the pool based on the first spatial candidate having the minimum MV distance; and
    inheriting, as the LIC flag value for the temporal candidate, the respective LIC flag value of the first spatial candidate that has the minimum MV distance.

10. The method of claim 1, wherein coding the video data comprises decoding encoded video data, the method further comprising:
    receiving, in an encoded video bitstream, a merge index identifying a position in the merge candidate list;
    selecting a motion vector (MV) candidate from the spatial candidates or the temporal candidate in the merge candidate list based on the received merge index; and
    performing one of:
        based on the LIC flag value of the selected MV candidate being a true value, reconstructing the current block using the selected MV candidate and LIC; or
        based on the LIC flag value of the selected MV candidate being a false value, reconstructing the current block using the selected MV candidate and without performing LIC.

11. The method of claim 1, wherein coding the video data comprises encoding the video data, the method further comprising:
    encoding the current block using a motion vector (MV) candidate selected from the spatial candidates or the temporal candidate included in the merge candidate list; performing one of:
        based on the LIC flag value of the selected MV candidate being set to a true value, performing LIC to encode the current block; or
        based on the LIC flag value of the selected MV candidate being set to a false value, encoding the current block without performing LIC;
    determining a merge index that identifies a position of the selected merge candidate in the merge candidate list; and
    signaling, in an encoded video bitstream, the merge index that identifies the position of the selected merge candidate in the merge candidate list.

12. A video coding device comprising:
a memory configured to store video data; and
processing circuitry in communication with the memory, the processing circuitry being configured to:
determine that a current block of the video data stored to the memory is to be coded according to a merge mode;
determine a temporal candidate associated with a merge candidate list for the current block in accordance with the merge mode;
determine a pool of spatial candidates associated with the merge candidate list, based on each spatial candidate of the pool having a same reference picture as the temporal candidate; and
set a local illumination compensation (LIC) flag value for the temporal candidate based on respective LIC flag values of one or more spatial candidates of the pool.

13. The video coding device of claim 12, wherein to set the LIC flag value for the temporal candidate based on the respective LIC flag values of the one or more spatial candidates of the pool, the processing circuitry is configured to set the LIC flag value for the temporal candidate using the respective LIC flag values of the one or more spatial candidates of the pool based on all of the spatial candidates of the pool having been added to the merge candidate list prior to the temporal candidate being added to the merge candidate list.

14. The video coding device of claim 12, wherein to set the LIC flag value for the temporal candidate based on the respective LIC flag values of the one or more spatial candidates of the pool, the processing circuitry is configured to set the LIC flag value for the temporal candidate using the respective LIC flag values of the one or more spatial candidates of the pool based on all of the spatial candidates of the pool being derived from spatial neighboring blocks of the current block in a current picture of the video data.

15. The video coding device of claim 12, wherein the pool of spatial candidates includes at least one spatial candidate derived from a block that is not positioned adjacently to the current block in a current picture of the video data.

16. The video coding device of claim 15, wherein the spatial candidate derived from the block that is not positioned adjacently to the current block is a first spatial candidate of the pool, and wherein the pool of spatial candidates further includes a second spatial candidate derived from a neighboring block that is positioned adjacently to the current block in the current picture of the video data.

17. The video coding device of claim 12, wherein to set the LIC flag value for the temporal candidate based on the respective LIC flag values of the one or more spatial candidates of the pool, the processing circuitry is configured to set the LIC flag value to a true value based on at least one of the respective LIC flag values of the one or more spatial candidates of the pool being set to the true value.

18. The video coding device of claim 12, wherein to set the LIC flag value for the temporal candidate based on the respective LIC flag values of the one or more spatial candidates of the pool, the processing circuitry is configured to set the LIC flag value to a false value based on all of the respective LIC flag values of the one or more spatial candidates of the pool being set to the false value.

19. The video coding device of claim 12, wherein to set the LIC flag value for the temporal candidate based on the respective LIC flag values of the one or more spatial candidates of the pool, the processing circuitry is configured to inherit, as the LIC flag value for the temporal candidate, the respective LIC flag value of a first available spatial candidate of the pool.

20. The video coding device of claim 12, wherein to set the LIC flag value for the temporal candidate based on the respective LIC flag values of the one or more spatial candidates of the pool, the processing circuitry is configured to:
determine respective motion vector (MV) distances between the temporal candidate and each respective spatial candidate of the pool;
determine a minimum MV distance of the respective MV distances;
select a first spatial candidate from the pool based on the first spatial candidate having the minimum MV distance; and
inherit, as the LIC flag value for the temporal candidate, the respective LIC flag value of the first spatial candidate that has the minimum MV distance.

21. The video coding device of claim 12, wherein the video coding device is a video decoding device, the video decoding device further comprising a communication unit configured to receive, in an encoded video bitstream, a merge index identifying a position in the merge candidate list, wherein the processing circuitry is further configured to:
select a motion vector (MV) candidate from the spatial candidates or the temporal candidate in the merge candidate list based on the received merge index; and
based on the LIC flag value of the selected MV candidate being a true value, reconstruct the current block using the selected MV candidate and LIC;
based on the LIC flag value of the selected MV candidate being a false value, reconstruct the current block using the selected MV candidate and without performing LIC.

22. The video coding device of claim 12, wherein the video coding device is a video encoding device, wherein the processing circuitry is further configured to:
encode the current block using a motion vector (MV) candidate selected from the spatial candidates or the temporal candidate included in the merge candidate list;
based on the LIC flag value of the selected MV candidate being set to a true value, perform LIC to encode the current block;
based on the LIC flag value of the selected MV candidate being set to a false value, encode the current block without performing LIC; and
determine a merge index that identifies a position of the selected merge candidate in the merge candidate list, and
wherein the video encoding device further comprises a communication unit configured to signal, in an encoded video bitstream, the merge index that identifies the position of the selected merge candidate in the merge candidate list.

23. An apparatus comprising:
means for determining that a current block of video data is to be coded according to a merge mode;
means for determining a temporal candidate associated with a merge candidate list for the current block in accordance with the merge mode;
means for determining a pool of spatial candidates associated with the merge candidate list, based on each spatial candidate of the pool having a same reference picture as the temporal candidate; and means for setting a local illumination compensation (LIC) flag value for the temporal candidate based on respective LIC flag values of one or more spatial candidates of the pool.

24. A non-transitory computer-readable storage medium encoded with instructions that, when executed, cause one or more processors of a video coding device to:
determine that a current block of video data is to be coded according to a merge mode;
determine a temporal candidate associated with a merge candidate list for the current block in accordance with the merge mode;
determine a pool of spatial candidates associated with the merge candidate list, based on each spatial candidate of the pool having a same reference picture as the temporal candidate; and set a local illumination compensation (LIC) flag value for the temporal candidate based on respective LIC flag values of one or more spatial candidates of the pool.

* * * * *